US009668252B2

(12) United States Patent
Miklós et al.

(10) Patent No.: US 9,668,252 B2
(45) Date of Patent: May 30, 2017

(54) TECHNIQUE FOR DATA-OVER-NAS SIGNALLING

(75) Inventors: György Miklós, Pilisborosjenö (HU); Rikard Eriksson, Jörlanda (SE); Johan Rune, Lidingö (SE); Joachim Sachs, Sollentuna (SE)

(73) Assignee: TELEFONAKTIEBOLGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 14/387,401

(22) PCT Filed: Mar. 30, 2012

(86) PCT No.: PCT/EP2012/001427
§ 371 (c)(1),
(2), (4) Date: Dec. 23, 2014

(87) PCT Pub. No.: WO2013/143564
PCT Pub. Date: Oct. 3, 2013

(65) Prior Publication Data
US 2015/0103766 A1  Apr. 16, 2015

(51) Int. Cl.
*H04W 72/04* (2009.01)
*H04W 76/04* (2009.01)

(52) U.S. Cl.
CPC ......... *H04W 72/042* (2013.01); *H04W 76/04* (2013.01)

(58) Field of Classification Search
CPC .................................................. H04W 76/046
See application file for complete search history.

(56) References Cited

U.S. PATENT DOCUMENTS

2006/0007861 A1* 1/2006 Kurzmann .......... H04W 76/022
370/235
2010/0235620 A1* 9/2010 Nylander ................ H04L 63/20
713/151

FOREIGN PATENT DOCUMENTS

WO   2011119680 A2   9/2011

OTHER PUBLICATIONS

Unknown, Author, "3GPP TR 23.888 V1.4.0 (Aug. 2011)", 3rd Generation Partnership Project; Technical Specification Group Services and System Aspects; System Improvements for Machine-Type Communications; (Release 11), Aug. 2011, pp. 1-139.
(Continued)

*Primary Examiner* — Hassan Kizou
*Assistant Examiner* — Ashil Farahmand
(74) *Attorney, Agent, or Firm* — Murphy, Bilak & Homiller, PLLC

(57) ABSTRACT

A technique for signalling activation or deactivation of a data-over-non-access-stratum, NAS, transmission scheme is disclosed, the transmission scheme being for transmitting data packets over the NAS between a terminal and a base station, and being started in an idle mode. In a method aspect, there are steps of determining a trigger condition indicating a need for the data-over-NAS transmission scheme, and signalling an indication for activation or deactivation in response to fulfilment or non-fulfilment of the determined trigger condition. In another method aspect, there may be steps of receiving the indication for activation or deactivation, and activating or deactivating the data-over-NAS transmission scheme in response to the signalled indication.

10 Claims, 11 Drawing Sheets

(56) References Cited

OTHER PUBLICATIONS

Unknown, Author, "3GPP TR 23.888 V1.6.1 (Feb. 2012)", 3rd Generation Partnership Project; Technical Specification Group Services and System Aspects; System Improvements for Machine-Type Communications (Release 11), Feb. 2012, pp. 1-165.

Unknown, Author, "Efficient Small Data Transmission", SA WG2 Meeting #86, S2-113826, Vodafone/IPWireless, Naantali, Finland, Jul. 11-15, 2011, pp. 1-4.

Unknown, Author, "MTC Small Data Identification Mechanism for Non-SMS Small Data Transmission Solution", SA WG2 Meeting #87, S2-114341, MediaTek Inc., Jeju Island, South Korea, Oct. 10-14, 2011, pp. 1-8.

\* cited by examiner

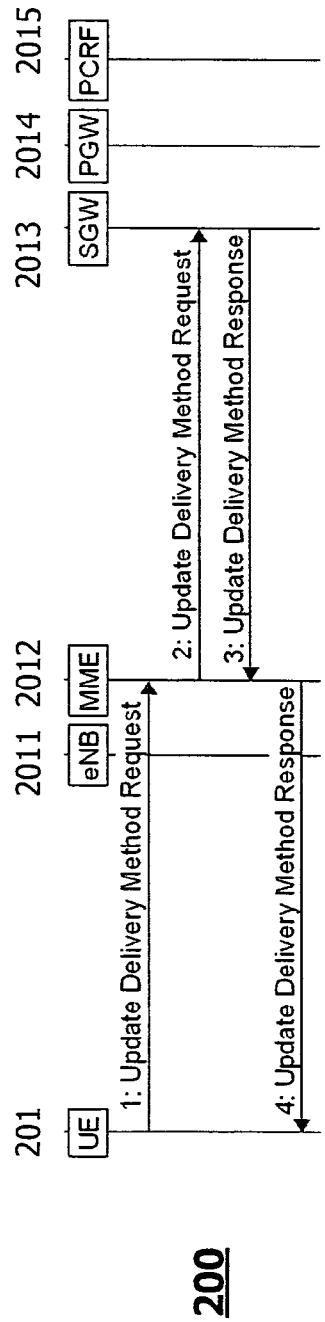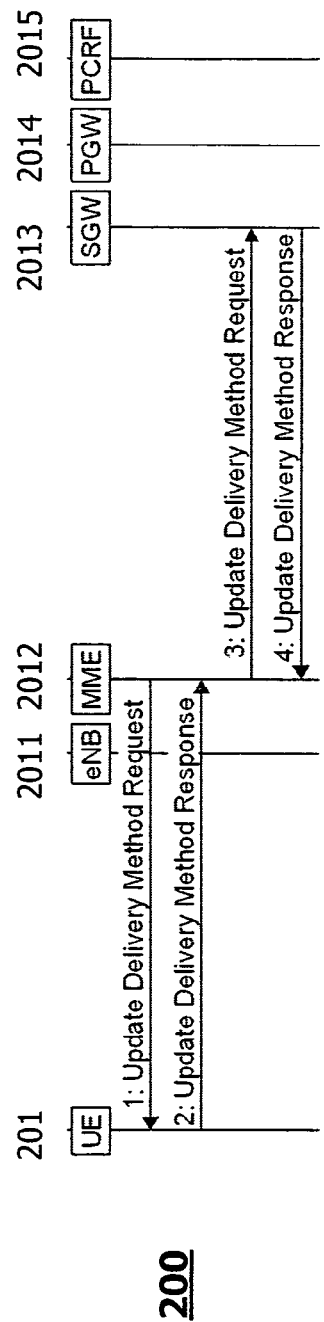

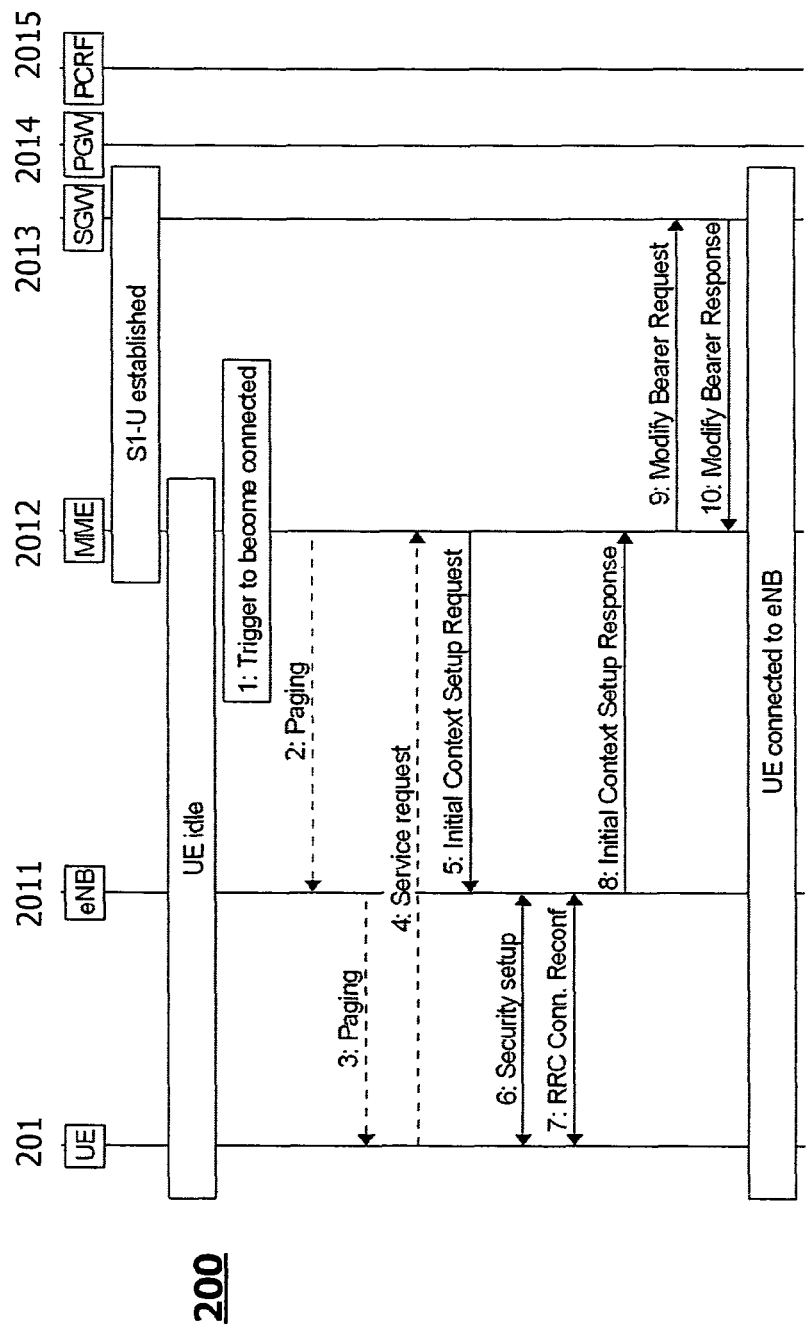

TECHNIQUE FOR DATA-OVER-NAS SIGNALLING

TECHNICAL FIELD

The present disclosure generally relates to transmission scheme signalling. Specifically, a technique for signalling activation or deactivation of a data-over-Non-Access-Stratum (NAS) transmission scheme is described.

BACKGROUND

Optimizations for so-called "small data" scenarios—that is, scenarios in which only very few data are transferred in a given time unit—are being discussed in $3^{rd}$ Generation Partnership Project (3GPP). Such scenarios may include infrequent transfer of a small number of data packets, although the exact data amount does not need to be defined explicitly. Example use cases are sensor or actuator devices which transmit or receive small amounts of data regularly but not continuously (e.g., a sensor transmitting its measurement report once per time unit, such as every ten minutes).

Current communication systems are typically not optimized for this type of small data transfer, and a large overhead is thus involved in "small data" scenarios. One possible optimization has been proposed by 3GPP, in which the NAS protocol is used to transfer small data amounts, see 3GPP SA WG2 Temporary Document S2-113826, "Small Data Transfer (E-UTRAN): Use of pre-established NAS security context to transfer the IP packet as NAS signalling without establishing RRC security". The main concept of data-over-NAS will now be described with reference to FIG. 1, which shows an example case of uplink transmission in a 3GPP Long Term Evolution (LTE) communication system.

FIG. 1 illustrates the principle of the data-over-NAS transmission scheme in the uplink. Specifically, FIG. 1 shows a communication network 100 comprising a terminal, or User Equipment (UE) 101, a base station (such as an (evolved) node B, (e)NB) 1011 and a Mobility Management Entity (MME) 1012, and the associated NAS signalling. Initially, the basic random access and Radio Resource Control (RRC) connection setup procedures may be used as defined in the 3GPP specifications. An RRC Connection Setup Complete message carries the data packet(s) (denoted as "NAS Uplink (UL) DATA") from the UE 101 to the base station 1011. The NAS data are then transferred from the base station 1011 to the MME 1012 in an Initial UE Message over the S1 interface. The S1 interface is the control plane interface between the base station 1011 and the MME 1012. If there is some follow-up downlink data within a short period of time, the follow-up data (denoted as "NAS Downlink (DL) DATA") can be sent over NAS in a Downlink NAS Transport message from the MME 1012 to the base station 1011 and from there via a DL Information Transfer message to the UE 101.

After a given period of time, the S1 connection and the RRC connection may be released as shown in FIG. 1. Then, between the MME 1012 and a Serving Gateway (SGW, not shown), some special packet delivery mechanism is needed (i.e., to send some data packets over the S11 interface, wherein the S11 interface stands for the interface between the MME 1012 and the SGW in the Evolved Packet System, EPS).

FIG. 2 illustrates the principle of the data-over-NAS transmission scheme in the downlink. FIG. 2 again shows the communication network 100 comprising the UE 101, the base station 1011 and the MME 1012 and the associated NAS signalling. In the case of a DL packet, if the S1 interface and RRC connection are not established for the UE 101, the MME 1012 first needs to perform paging which triggers the UE 101 to send a Service request message (in the RRC Connection Setup Complete message shown in FIG. 2), which message is forwarded by the base station 1011 to the MME 1012 in an Initial UE Message.

When the MME 1012 receives the Service request, the MME 1012 may use a priori information pertaining to the UE 101 or the associated subscription to determine that no bearer setup is needed. Based on that determination, the MME 1012 can send the downlink small data as "NAS DL DATA" in a Downlink NAS Transport message, which data may be forwarded from the base station 1011 to the UE 101 in a DL Information Transfer message.

The signalling illustrated in FIG. 2 may possibly be followed by uplink data transmission as well (see messages UL Information Transfer and Uplink NAS Transport in FIG. 2). After a certain period of time, the MME 1012 may again release the S1 connection and RRC connection.

The data-over-NAS transmission scheme discussed above with reference to FIGS. 1 and 2 has certain advantages. The signalling load on both the MME 1011 and the UE 101 can be reduced. For the UE 101, a consequence resides in the fact that the energy consumption will be reduced. This is especially important for small devices, e.g., sensors or actuators that may run on a limited power supply (e.g., on battery).

The data-over-NAS transmission scheme requires a special behaviour both in the UE 101 and the network, and hence its use has to be negotiated in advance. This can be done, for example, during the Attach or connection setup procedures.

It has been considered to use the data-over-NAS transmission scheme for a single bearer in a dynamic fashion when the use of NAS is expected to reduce overhead based on some prediction of the traffic pattern. In such a case the (same) bearer is "switched" between the data-over-NAS transmission scheme and the regular bearer approach without any explicit control signalling. The switching might, for example, be subject to the following rules:

The UE 101 applies the data-over-NAS transmission scheme for an uplink packet when a local application needs to send just one data packet (and this uplink packet should not trigger multiple downlink packets).

The MME 1012 uses information of the subscription to determine whether a packet sent over NAS in the uplink should result in the establishment of a regular bearer or not.

For a downlink packet, the Downlink Data Notification acknowledgement (ACK) sent by the MME 1012 to the SGW is extended to inform the SGW that the packet has been delivered (or that the normal Network Initiated Service Request procedure has been triggered).

If the SGW has not received a Downlink Data Notification ACK indicating that the normal Network Initiated Service Request procedure has been triggered, when a second downlink data packet arrives in the SGW, the SGW sends a new Downlink Data Notification with that data packet appended to the MME 1012. If the SGW receives multiple data packets, the SGW can use the Downlink Data Notification to request the MME 1012 to perform the normal Network Initiated Service Request procedure.

The SGW monitors whether subsequent downlink data packets have arrived after an initial downlink packet for the delivery to the UE 101 and whether the total size of these data packets is greater than the value configured by the network operator's policy or by the subscription. If this is the case, the SGW sends the Downlink Data Notification to request the establishment of the S1 bearer(s).

It has been found that there exist difficulties with the dynamic switching between the data-over-NAS transmission scheme and the regular bearer mechanism. Firstly, relying on a local application in the UE 101 to select the type of transmission has several disadvantages:

The application has to have information on the transmission scheme and must be able to select between different Application Programming Interfaces (APIs) for different transmissions. Hence, the application has to be adapted for use in an NAS-enabled network, which means that regular off-the-shelf applications (e.g., those used on laptops) cannot be used.

For an uplink packet in the UE 101, it may turn out to be difficult in practice to determine by the application, on a packet-by-packet basis, how many packets are to follow. Here, it may be too restrictive to put requirements on the application itself. Furthermore, it is often difficult to predict future traffic patterns.

There is a risk if the application makes the wrong decision: if the initial data packets are sent as data-over-NAS and it frequently turns out that the UE 101 has subsequent data packets and then transitions to connected mode, the total signalling load on NAS is actually higher compared to today's procedures (i.e., when the UE 101 immediately goes to connected mode) because of the additional initial NAS signalling.

Secondly, the algorithm in the UE 101 and in the core network to dynamically switch between the data-over-NAS and regular bearer mechanism can lead to a number of new error cases that take a lot of effort to handle. Testing, debugging and operating the communication system may become more difficult and more costly due to the uncertainty regarding which path an individual data packet in a traffic flow would take.

Thirdly, for downlink traffic, it is especially difficult to predict how many packets are to follow an initial downlink packet. The amount of buffered downlink data packets in an SGW does not give a good indication, because new downlink data packets are often the result of an uplink response to the initial downlink data packets. So the SGW has no means to easily determine whether there will be many downlink data packets following an initial downlink data packet. Furthermore, a strategy which sends the initial downlink data packet as data-over-NAS and then sets up the regular bearers for subsequent downlink data packets is prone to a large overhead, because it incurs not only the already existing idle-connected-idle signalling overhead, but also the overhead of sending the first data packet over NAS. So such a strategy may be inefficient if there are often subsequent data packets that follow the initial data packet.

SUMMARY

Accordingly, there is a need for an implementation of the data-over-NAS transmission scheme that avoids one or more of the problems discussed above, or other problems.

In a first aspect, there is provided a method for signalling activation or deactivation of a data-over-non-access-stratum, NAS, transmission scheme, the transmission scheme being for transmitting data packets over the NAS between a terminal and a base station, and being started in an idle mode, wherein the method comprises the steps of determining a trigger condition indicating a need for the data-over-NAS transmission scheme, and signalling an indication for activation or deactivation in response to fulfilment or non-fulfilment of the determined trigger condition.

For a given bearer it may thus be explicitly signalled whether to activate or deactivate the data-over-NAS scheme. The signalling can take place when the bearer is set up or at a later time. Accordingly, carrying excessive amounts of traffic by NAS may be avoided to reduce the NAS signalling load. The bearer mechanism in the radio interface, which is optimized for larger amounts of traffic, may then be flexibly used.

In a first refinement, the determining step may comprise matching at least one data packet against a filter, and the signalling step is performed if the at least one uplink or downlink data packet matches the filter. The filter may be implemented as a hardware solution, as a software routine or as a combination thereof. As an example, the filter may comprise a functionality for analysing one or more data packets (e.g., with respect to their size and/or temporal occurrence) and a functionality for matching the result of the analysis with one or more rules or criteria. It may then be determined that the one or more data packets match the filter if the one or more rules or criteria are fulfilled (and vice versa).

The filter may comprise one of the following: a timeout threshold so as to match all data packets against the filter before the timeout threshold is reached; a size threshold of a number of bytes so as to match the byte sizes of all data packets against the filter before a timeout is reached; and a Token Bucket.

A Mobility Management Entity, MME, may comprise the filter, and the method may further comprise maintaining, by the MME, the at least one bearer for a predetermined period of time when the data packet traffic reaches the threshold, and establishing, by the MME, the at least one bearer in a connected mode if the data packet traffic still reaches the threshold when the predetermined period of time has passed. This approach may assure a secure and correct decision whether or not to activate the data-over-NAS transmission scheme in order to avoid using data-over-NAS when actually a regular connected bearer was the more fitting choice.

In a second refinement, the determining step may be performed by one of the terminal, a Packet Data Network, PDN Gateway, PGW, a Serving Gateway SGW, or an MME. For instance, the signalling step may be performed in a PGW, and may further comprise signalling the indication to the terminal via an Update Bearer Request message and a Downlink NAS Transport message. Alternatively, the signalling step may be performed in the terminal, and may further comprise signalling the indication to an MME via the base station via an Update Delivery Method Request message and an Update Delivery Method Response message. Alternatively, the signalling step may be performed in an MME, and may further comprise signalling the indication to the terminal via an Update Delivery Method Request message and an Update Delivery Method Response message, both messages being initially transmitted by the MME. These options ensure versatility of the decision whether to use the data-over-NAS scheme, as any one of those nodes may have, depending on the application, the best survey on the (future) traffic patterns.

In a second aspect, there is provided a method for activating or deactivating of a data-over-non-access-stratum, NAS, transmission scheme, the transmission scheme being for transmitting data packets over the NAS between a terminal and a base station, and being started in an idle mode, wherein the method comprises the steps of receiving an indication for activation or deactivation; and activating or deactivating the data-over-NAS transmission scheme in response to the signalled indication.

As a refinement of the first or second aspect, the at least one bearer may comprise a plurality of bearers, the step for activating may perform activation of the data-over-NAS transmission scheme on a first subset of bearers, and the step for deactivating may perform deactivation of the data-over-NAS transmission scheme on a second subset of one or more bearers different from the first subset.

Having a plurality of bearers partly for data-over-NAS and partly for regular data transmission enables an improvement in assigning the correct service to its respective needs, since "small data" applications or devices have no need for a regular bearer, whereas "big data" applications (such as downloads or realtime services) could not use data-over-NAS. In other words, this makes it possible to define multiple bearers for a given UE, such that for instance one bearer uses the data-over-NAS transmission scheme, while another bearer uses the regular bearer based data transmission over the air interface. In that way, data-over-NAS can be used for infrequent transmission of small data, while regular bearers can be used for larger amounts of traffic (e.g., software downloads, data file uploads).

As another refinement of the first or second aspect, the method may further comprise routing, after activation of the data-over-NAS transmission scheme on the at least one bearer, the data packets over the at least one bearer in the idle mode. In one case, the data packets may be transmitted on the uplink of the bearer. If so, the determining step may comprise thresholding uplink traffic against a traffic volume threshold, and if the traffic volume is below the threshold, the data-over-NAS transmission scheme is used, and if the traffic volume is equal to or greater than the threshold, the data packets are transmitted over at least one bearer established in a connected mode.

Further, the method aspects may comprise a separate PDN connection involving a first bearer and a second bearer. Individual Internet Protocol, IP, addresses may be respectively assigned to the first and second bearers, wherein only one of the first and second bearers may employ the data-over NAS transmission scheme.

In another case, the data packets may be transmitted on the downlink of the bearer. If so, the method may further comprise transmitting the data packet from an MME, to the terminal by paging the terminal if the terminal is not in a connected mode, receiving, at the MME, a Service Request message responsive to the paging, and establishing a connection via the Evolved Packet System, EPS, S1 interface.

As a further refinement of the first or second aspect, the routing step may further comprise utilizing a radio bearer established in a connected mode for transmitting the data packets assigned to the data-over-NAS transmission scheme. This approach enables a quasi-utilization of the data-over-NAS transmission scheme even in cases in which the actual data-over-NAS transmission scheme is disabled due to the terminal being in a connected mode.

As a still further refinement of the first and second aspects, the routing may at least partially be performed between an SGW and an MME. If so, the method may further comprise establishing a GTP-U tunnel between the MME and the SGW based on signalling on the S11 interface, wherein GTP-U stands for the user plane of the General Packet Radio Service, GPRS, Tunnelling Protocol, GTP, and S11 interface stands for the interface between the MME and the SGW in EPS. In the latter case, the method may further comprise utilizing S1-U tunnelling between the MME and the SGW, wherein S1-U stands for the user-plane part of the S1 interface. The method may comprise extending the GTP-C protocol on the S11 interface by a functionality of carrying the data packets, wherein GTP-C stands for the control plane of the General Packet Radio Service, GPRS, Tunnelling Protocol, GTP. The method may also further comprise accommodating the data packets in or on a Downlink Data Notification message. This enables managing the packet transfer between the MME and the SGW, which managing need is a consequence of the data-over-NAS transmission scheme.

As another refinement of the first or second aspect, the method may further comprise releasing Radio Resource Control, RRC, and an S1 connection upon completion of the data-over-NAS transmission scheme. If so, the MME may release the S1 connection upon reception of a release indication. In the latter case, the method may further comprise accommodating the release indication in or on a data-over-NAS message. This solution enables, by timely releasing the RRC and S1 connections, freeing up resources of the base station and reducing energy consumption in the terminal.

As a further refinement of the first or second aspect, the method may further comprise routing the data packets over the at least one bearer, which routing my comprise accommodating at least one of the data packets in NAS signalling-related messages during establishment of the at least one bearer in a connected mode, and routing the subsequent data packets over the at least one bearer in the connected mode upon completion of the establishment. If so, the method may further comprise determining whether substantially all data packets in a given communication are to be transmitted using the data-over-NAS transmission scheme, and aborting, if the determining is affirmative, the bearer establishment. This enables decreasing a delay for the initial (uplink) packet, since already the transition phase of the bearer from idle-to-connected can be exploited for transmitting at least one data packet.

It is to be noted that a network entity (or several entities) may implement any of the technical details set forth for the method aspects herein, and thus achieves the same advantages. In other words, the network entity (or entities) may comprise components adapted to perform any of the method steps disclosed herein. There is also provided a network system comprising one or more of such entities.

BRIEF DESCRIPTION OF THE DRAWINGS

The embodiments of the technique presented herein are described herein below with reference to the accompanying drawings, in which:

FIG. 6A shows explicit signalling according to the first exemplary embodiment initiated by a UE;

FIG. 6B shows explicit signalling according to the first exemplary embodiment initiated by an MME;

FIG. 10B shows the third exemplary embodiment for communication between the MME and the SGW in case of the terminal/UE being initially being in the idle mode.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, the embodiments will primarily be described in the context of an LTE-type communication system; however, this does not rule out the use of the present technique in other communication systems.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

For the purpose of the present disclosure, when a "bearer" is cited in conjunction with the idle mode (occasionally indicated by quotation marks around the term bearer), such language is meant, without loss of generality, to be directed to a "raw" form of the bearer in the idle mode (comprising any preparatory measure for establishing a bearer, such as messaging exchanged in preparation of bearer establishment, or the bearer during transition from the idle mode to the connected mode). Moreover, when a bearer is cited in conjunction with the connected, the fully established (data radio) bearer between the base station and the mobile station is meant.

Figure 1:
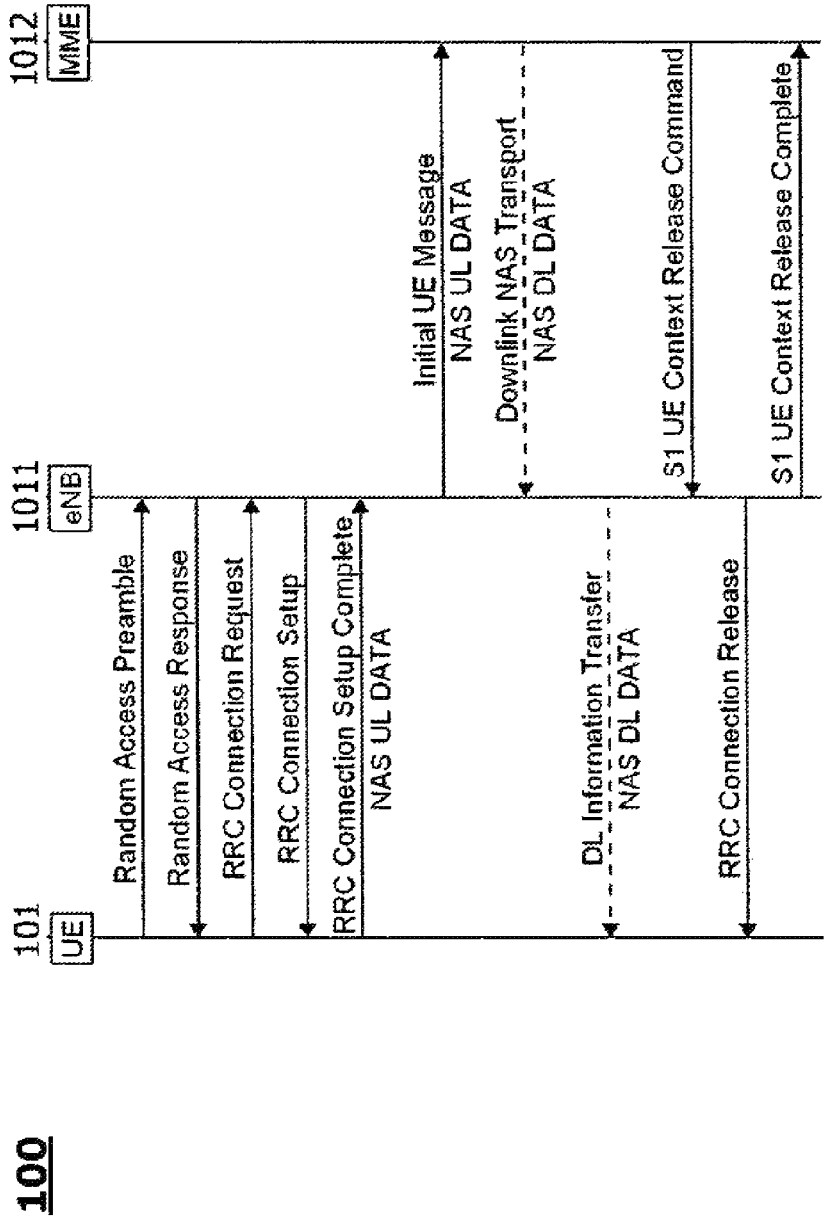
FIG. 1 shows the principle of the data-over-NAS transmission scheme in the uplink.
Figure 2:
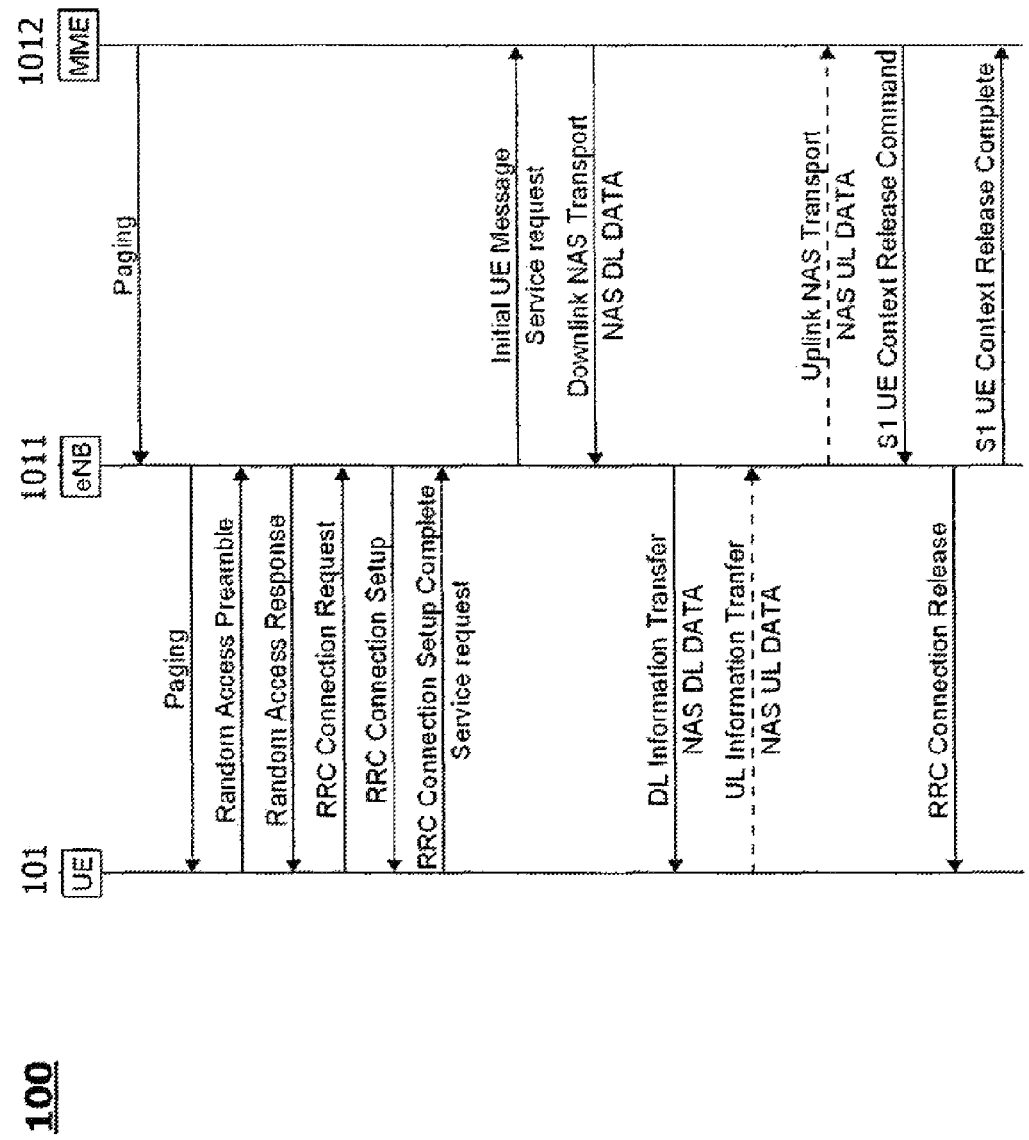
FIG. 2 shows the principle of the data-over-NAS transmission scheme in the downlink.
Figure 3:
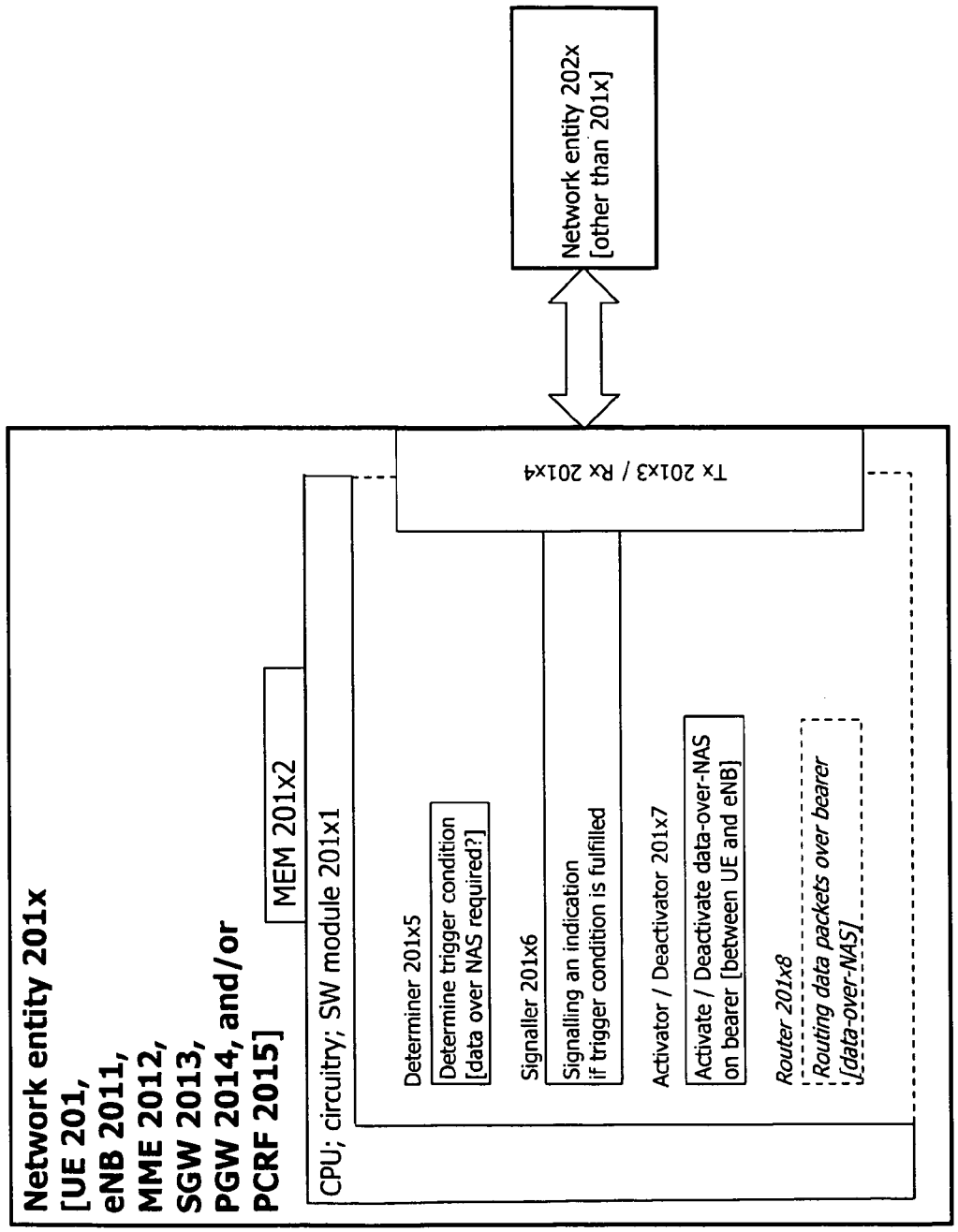
FIG. 3 shows the components comprised in an exemplary device embodiment realized in the form of a network entity.

FIG. 3 shows a general embodiment of a network entity $201x$ comprised in a communication system or network 200 compliant with the 3GPP LTE specifications. As indicated by the "x", the network entity $201x$ may be embodied by any one of (including also combinations of) a terminal (UE) 201, a base station ((e)NB) 2011, an MME 2012, an SGW 2013, a PGW 2014 and a PCRF 2015. The UE 201 may, for example, take the form of a mobile telephone, smartphone, network or data card, laptop, sensor or measurement unit, and so on. The system/network 200 may further comprise another network entity $202x$, which may be one (or more of) the UE 201, the base station ((e)NB) 2011, the MME 2012, the SGW 2013, the PGW 2014 and the PCRF 2015 being different from the network entity $201x$.

As shown in FIG. 3, the network entity $201x$ comprises a core functionality (e.g., one or more of a central processing unit (CPU), dedicated circuitry and/or a software module) $201x1$, a memory (and/or database) $201x2$, a transmitter $201x3$ and a receiver $201x4$. Moreover, the network entity $201x$ comprises a determiner $201x5$, a signaller $201x6$, an activator (and/or deactivator) $201x7$ and an optional router $201x8$. Although not explicitly shown in FIG. 3, the network entity $202x$ may also comprise any one of the above components.

As indicated by the dashed extensions of the functional blocks of the CPU $201x1$ (wherein x=1, 2, 3, 4 and/or 5), the determiner $201x5$, the signaller $201x6$, the activator (or deactivator) $201x7$ and the router $201x8$ (of the network entity $201x$) and the corresponding components (of the network entity $202x$) as well as the memory $201x2$, the transmitter $201x3$ and the receiver $201x4$ may at least partially be functionalities running on the CPU $201x1$, or may alternatively be separate functional entities or means controlled by the CPU $201x1$ and supplying the same with information. For both the network entities $201x$ and $202x$, the transmitter and receiver components $201x3$, $201x4$ (and the corresponding components in network entity $202x$) may be realized to comprise suitable interfaces and/or suitable signal generation and evaluation functions.

The CPU $201x1$ may be configured, for example, using software residing in the memories $201x2$, to process various data inputs and to control the functions of the memory $201x2$, the transmitter $201x3$ and the receiver $201x4$ (as well the determiner $201x5$, the signaller $201x6$, the activator (and/or deactivator) $201x7$ and the router $201x8$ of the network entity $201x$ and the corresponding components of the network entity $202x$. The memory $201x2$ may serve for storing program code for carrying out the methods according to the aspects disclosed herein, when executed by the CPU $201x1$.

It is to be noted that the transmitter $201x3$ and the receiver $201x4$ may be provided as an integral transceiver, as is indicated in FIG. 3. It is further to be noted that the transmitters/receivers $201x3$, $201x4$ may be implemented as physical transmitters/receivers for transceiving via an air interface or a wired connection (e.g., between the network entities $201x$ and $202x$ when they are embodied as UE 201 and base station 2011), as routing/forwarding entities/interfaces between network elements (e.g., between the network entities $201x$ and $202x$ when they are embodied as core network elements, such as MME 2012 and SGW 2013), as functionalities for writing/reading information into/from a given memory area (e.g., between the network entities $201x$ and $202x$ when they are embodied as two (or more) logical units disposed on one physical unit) or as any suitable combination of the above. At least one of the above-described determiner $201x5$, signaller $201x6$, activator (and/or deactivator) $201x7$ and router $201x8$ of the network entity $201x$ and the corresponding components of the network entity $202x$, or the respective functionalities, may also be implemented as a chipset, module or subassembly.

Figure 4:
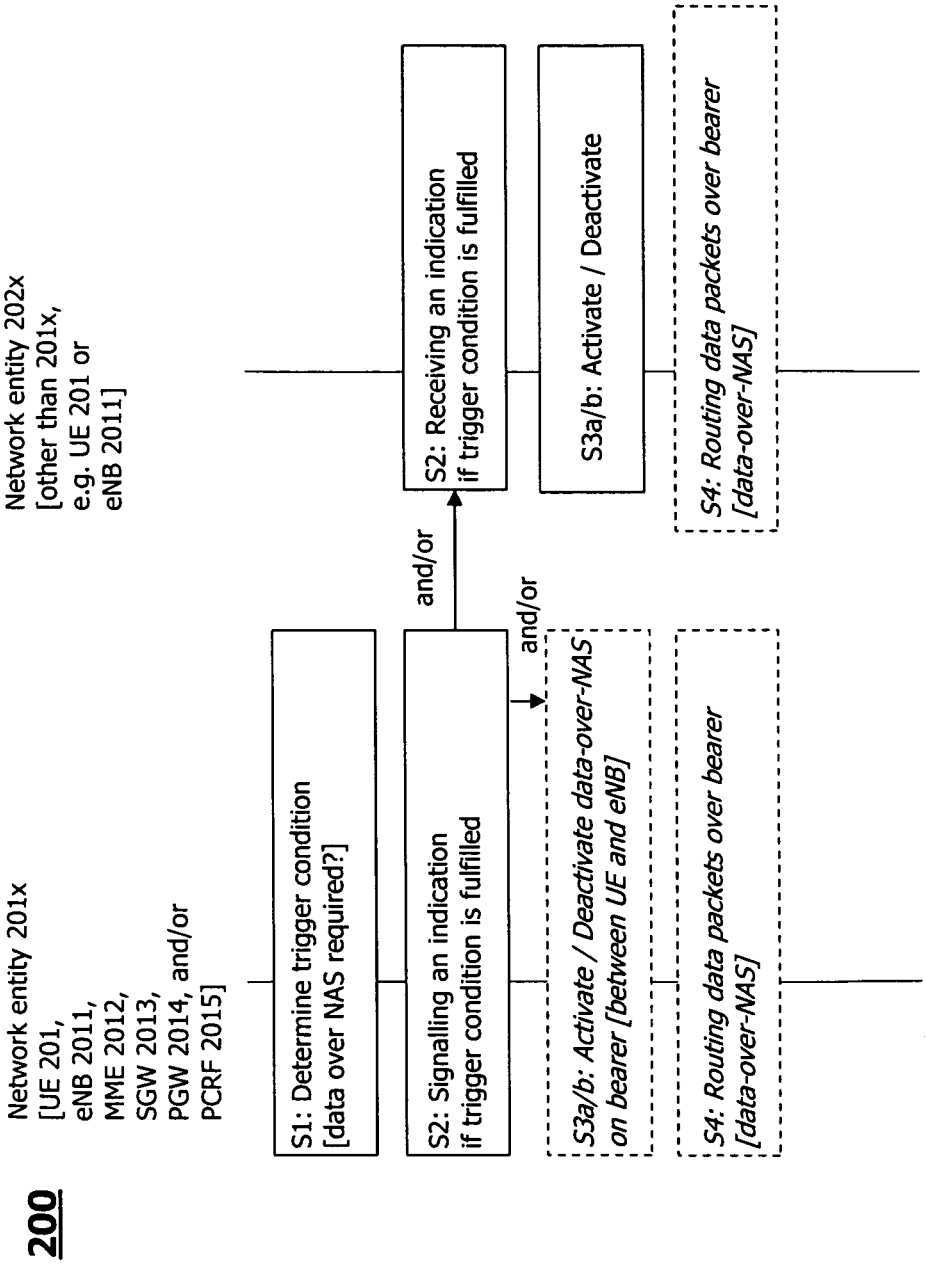
FIG. 4 shows a method embodiment which also reflects the interaction between the components of the device embodiment.

FIG. 4 illustrates an embodiment of a method for signalling activation or deactivation of a data-over-NAS transmission scheme. In the signalling diagram of FIG. 4, signalling between elements is indicated in the horizontal direction, while time aspects between signalling are reflected in the vertical arrangement of the signalling sequence as well as in the sequence numbers. It is to be noted that the time aspects indicated in FIG. 4 do not necessarily restrict any one of the method steps shown to the step sequence outlined in FIG. 4. This applies in particular to method steps that are functionally disjunctive with each other. For instance, all steps S1 to S4 are shown to be timely substantially flowing; however, especially steps S1 (determining) and S2 (signalling) may or may not be carried out directly subsequently. This applies also to steps S3 (activating/deactivating) and S4 (routing).

Referring still to the signalling diagram of FIG. 4 (to be read along with the network entity 201x (and 202x) illustrated in FIG. 3), in step S1, the determiner 201x5 of the network entity 201x performs determining a trigger condition potentially indicating a need for the data-over-NAS transmission scheme. Responsive thereto, in step S2, the signaller 201x6 (which may interact with the transmitter/receiver 201x3/201x4, as shown by the elongated box of the signaller 201x6) performs signalling an indication for activation or deactivation in response to fulfilment or non-fulfilment of the determined trigger condition Accordingly, further in step S2, the receiver 201x4 of the network entity 201x or of any other network entity performs receiving an indication for activation or deactivation. The indication may be received by the same network entity (UE 201, base station 2011, MME 2012, SGW 2013, PG 2014, PCRF 2015) or by another network entity (involving, in some cases, also forwarding via one or more of the network entities). Responsive thereto, in step S3a or S3b, the activator/deactivator 201x7 of the network entity 201x performs activating or deactivating the data-over-NAS transmission scheme on the at least one bearer in response to the signalled indication.

Various embodiments, examples and concretizations pertaining to the steps of determining, signalling, receiving and activating/deactivating as generally discussed above will now be described with respect to the following more detailed embodiments.

Figure 5:
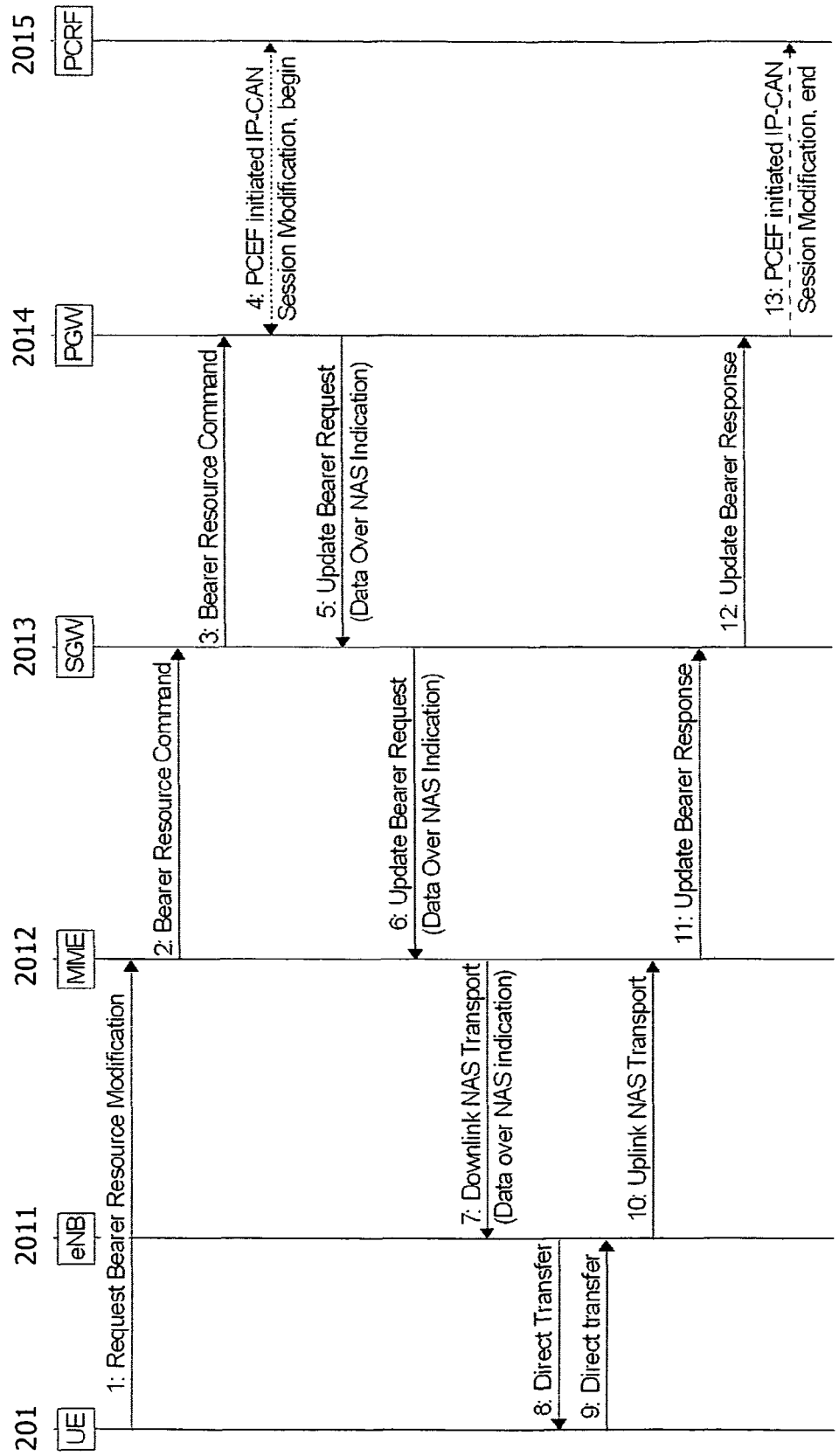
FIG. 5 shows a first exemplary embodiment for explicit signalling for switching between idle mode (and the data-over-NAS transmission scheme) and regular bearer (connected) mode.

Explicit Signalling for Switching Method Between Data-Over-NAS and Regular Bearer Mode FIG. 5 shows a first exemplary embodiment for explicit signalling for switching between idle mode (and the data-over-NAS transmission scheme) and regular bearer (connected) mode in connection with activating or deactivating the data-over-NAS transmission scheme. As is shown in FIG. 5, the network/system 200 comprises the UE 201, the base station ((e)NB) 2011, the MME 2012, the SGW 2013, the PGW 2014 and the PCRF 2015.

It is possible to use explicit signalling to switch the idle mode delivery method from regular bearer to data-over-NAS or vice versa (i.e., to activate and deactivate the data-over-NAS transmission scheme). The trigger for such signalling may come from various sources, as will be discussed below in greater detail.

The determining step S1 as generally illustrated in FIG. 4 may comprise matching at least one data packet against a filter, and the signalling step is performed if the at least one uplink or downlink data packet matches the filter. The filter may have one or more concretizations or implementations such as a timeout threshold so as to match all data packets against the filter before the timeout threshold is reached, a size threshold of a number of bytes so as to match the byte sizes of all data packets against the filter before a timeout is reached, and/or a Token Bucket as will be described in greater detail below.

In an exemplary case, the MME 2012 may comprise the filter. In this case, the MME may maintain the at least one bearer for a predetermined period of time when the data packet traffic reaches the threshold, and may establish the at least one bearer in a connected mode if the data packet traffic still reaches the threshold when the predetermined period of time has passed.

In another case illustrated in FIG. 5 the determining step may be performed by the UE 201. That is, the UE 201 may have a filter installed for triggering a switch from data-over-NAS (in the idle mode) to regular bearer mode or vice versa. When an uplink packet matches the filter, the switch is initiated to activate the data-over-NAS transmission scheme. The filter may include protocol, IP address and port based rules, or rules on the packet size. Additionally, or alternatively, the filter may use Deep Packet Inspection (DPI) to look into the IP packet contents.

The UE 201 may be configured with the threshold through various means, such as the broadcast system information, Over-the-air Universal Subscriber Identity Module (OTA USIM) configuration signalling, NAS signalling (e.g. during the Attach procedure) or RRC signalling, such as via the RRC ConnectionSetup message. Using the RRC ConnectionSetup message allows great flexibility in the threshold setting, which then may depend on, for example, the current load in the cell or in the MME.

As mentioned above, the filter criteria may be extended with a timeout. That is, when a filter criterion is fulfilled by all packets for a specified timeout period of time, a switch may be initiated/triggered. For instance, a filter may define a traffic threshold or a type of traffic which triggers a change from data-over-NAS to regular bearer scheme. When all packets match a filter for data-over-NAS for a given timeout, a switch is triggered to change back to data-over-NAS transmission scheme again. Further, it would be possible to have the UE 201 filter downlink traffic as well and trigger a switch based on downlink traffic.

Still further, for instance, the determining step may be performed by one of the PGW 2014 and SGW 2013. In other words, the filtering can also be performed in the PGW 2014 or in the SGW 2013. Filtering can be performed on downlink traffic, and a timeout criterion may also be included as above. Also, the PGW 2014 or SGW 2013 can filter for uplink traffic. This case may include, for instance, a situation in which the PGW 2014 or the SGW 2013 may trigger a switch from data-over-NAS (in idle mode) to a regular bearer (in connected mode) for a deactivation of the data-over-NAS transmission scheme, or trigger establishment of a regular bearer in parallel with the data-over-NAS transmission scheme, when the PGW 2014 or SGW 2013 receives a downlink Internet Protocol (IP) packet exceeding a certain threshold size or a Transport Control Protocol (TCP) or User Datagram Protocol (UDP) packet addressed to a certain port or based on DPI.

Still further, the determining step may be performed by the MME 2012. In other words, the switch (and activation/deactivation of the data-over-NAS transmission scheme) may also be initiated/triggered in the MME 2012 based on filtering uplink and/or downlink traffic, possibly extended with a timeout. This can be used to switch from the data-over-NAS transmission scheme (in the idle mode) to regular bearer method in case it is determined that the traffic is not small data intended for the data-over-NAS optimization.

In addition, for instance, the signalling step may be performed in the PGW 2014, and may further comprise signalling the indication to the UE 201 via an Update Bearer Request message and a Downlink NAS Transport message (cf. steps 5, 6 and 7 in FIG. 5). In step 8, the direct transfer message may carry the complete NAS message as carried in step 7, including the data-over-NAS indication as well.

Moreover, the MME 2012 may also trigger a switch from data-over-NAS transmission scheme to regular bearer method (i.e., deactivate the data-over-NAS transmission scheme) in case the amount of traffic exceeds a certain threshold. That threshold can be defined in terms of the number of packets in a certain time period, or the number of bytes sent in a certain time period, or in other ways such as using a token bucket, as mentioned above.

The base station (eNB) 2011 may send explicit signalling to the UE 201 or the MME 2012 to indicate that there is excessive NAS signalling carried over RRC. This could be the case when the resources for RRC control signalling of the base station 2011 are getting congested. Such signalling can then trigger the UE 201 or the MME 2012 to initiate a change from the data-over-NAS transmission scheme to the regular bearer method.

Once the trigger condition is fulfilled, explicit signalling may be used to notify all concerned nodes (e.g., the base station 2011, MME 2012, SGW 2013, PGW 2014 and/or PCRF 2015) that the property of the bearer has changed so as to activate (or deactivate) the date-over-NAS transmission scheme.

FIG. 6A shows explicit signalling according to the first exemplary embodiment initiated by a UE 201. The signalling may be based on the UE requested bearer resource modification procedure, which uses signalling from the UE 201 via the MME 2012, SGW 2013 to the PGW 2014 to switch the method of operation for the bearer. For instance, the signalling step may be performed in the UE 201, and may further comprise signalling the indication to the MME 2012 via the base station 2011 via an Update Delivery Method Request message (see FIG. 6A, steps 1 and 2) and an Update Delivery Method Response message (see FIG. 6A, steps 3 and 4).

The PGW 2014 may then change the property of the bearer, by including or not including the data-over-NAS indication in the signalling. The MME 2012 may police the request after step 1, (i.e., the MME 2012 may check whether the UE 201 is eligible for using the data-over-NAS transmission scheme when the UE 201 requests usage for a given bearer).

The MME initiated case can also be treated by similar signalling, starting from step 2 in FIG. 6A. The SGW initiated case can be treated also by similar signalling, starting with step 3 in FIG. 6A. The PGW initiated case can be treated also by similar signalling, starting with step 4 in FIG. 6A.

Another option is also depicted in FIG. 6A. Here, the UE 201 signals to the MME 2012 using a new NAS signalling message to change the idle mode delivery method for a given bearer (e.g., to activate or deactivate the data-over-NAS transmission scheme). The MME 2012 may police the request (i.e., determine whether the UE 201 is eligible for the data-over-NAS transmission scheme). If so, the MME 2012 may signal to the SGW 2013 to change the setting for the given bearer. The SGW 2013 may return an appropriate acknowledgement, so that the MME 2012 can also return an acknowledgement to the UE 201. Note that the PGW 2014 and PCRF 2015 do not necessarily need to take part in the signalling described. However, it may be possible to notify the PGW 2014 and PCRF 2015 nodes as well if needed.

FIG. 6B shows explicit signalling according to the first exemplary embodiment initiated by an MME 2012. It is to be noted that step 3 could be started even before step 2.

For instance, the signalling step may be performed in the MME 2012, and may further comprise signalling the indication to the UE 201 via an Update Delivery Method Request message (see FIG. 6B, steps 1 or 3) and an Update Delivery Method Response message (see FIG. 6B, steps 2 or 4), both messages being initially transmitted by the MME 2012.

In case the data-over-NAS transmission scheme is activated, the UE 201 would be connected when the explicit signalling takes place, and the given bearer is already established between the UE 201 and the base station (eNB) 2011. In that case, it is possible to await occurrence of a timeout for the UE 201 to move/switch from connected mode to idle mode, so that the radio bearer on the air interface is released. Alternatively, the MME 2012 may use the event of scheme change from regular bearer (in connected mode) to data-over-NAS scheme (in idle mode) as a trigger to move to idle mode, so that occurrence of the timeout does not need to be awaited.

Policing for the Data-Over-NAS Traffic

A data-over-NAS "bearer" (meaning that in the idle mode, a full data radio bearer is not established) may have a traffic upper limit in order to avoid the erroneous use of the data-over-NAS transmission scheme. This prevents the use of a data-over-NAS bearer for excessive amounts of data packets, so that the MME 2012 does not degrade to a dedicated user plane node.

A traffic upper limit may be signalled to the UE 201 in advance (e.g. during the Attach and/or Tracking Area Update (TAU) procedures) or configured by other means, such as via broadcast system information or RRC signalling. The traffic upper limit may be expressed in, for example, terms of the number of packets in a given time period, or the number of bytes in a given time period, or by "token bucket" parameters, as described above.

Normally, the application (running, e.g., on the UE 201) may be devised such that the resulting traffic does not exceed the traffic threshold. However, if the threshold is exceeded, this can be detected by the MME 2012 which can use the signalling as described in chapter "Explicit signalling for switching method between data-over-NAS and regular bearer mode" to establish the bearer. Exceeding the threshold can also be detected in the PGW 2014. In that case, the traffic threshold may to be configured in the PGW 2014, or set up by the PCRF 2014, or signalled from the MME 2012 via the SGW 2013 during the establishment of the bearer. Yet another alternative resides in that the SGW 2013 may detect when the threshold is exceeded.

Moreover, when the threshold is reached, the MME 2012 may decide to keep the bearer scheme as data-over-NAS, but cause the UE 201 to transit to the connected mode when data traffic is present for a predetermined period of time. This can be accomplished for example by establishing the context of the UE 201 in the base station 2011, which results in the UE 201 becoming connected. This line of actions may be transparent for the UE 201 (i.e., the line of actions does not contravene existing constraints).

As still another alternative, the MME 2012 may also police the use of the data-over-NAS transmission scheme such that the MME 2012 may signal, to the UE 201, to guide whether to use the data-over-NAS transmission scheme or not, aiming to correct, or mitigate the consequences of a suboptimal choice of access/transmission scheme. This is particularly useful when the UE 201 is adapted to make the initial decision.

As still another alternative, the MME 2012 may reject a certain access procedure/transmission scheme and possibly indicate the access procedure/transmission scheme that should be used instead.

Another possibility resides in that the MME 2012 may indicate, for example in the first DL NAS message (such as the NAS Authentication Request message), that a regular bearer should be established, in case the UE 201 initiated activation of the data-over-NAS transmission scheme and the MME 2012 assesses that a regular bearer would be more prudent. This may optionally, but not necessarily, be augmented by a corresponding indication to the base station (eNB) 2011 (e.g., in the S1 Application Protocol (S1AP) Downlink NAS Transport message).

Yet another possibility resides in that if the MME 2012 receives data-over-NAS and determines that application of the data-over-NAS transmission scheme was an inappropriate choice of access/transmission scheme, the MME 2012 may either deactivate the data-over-NAS transmission scheme by switching to a regular bearer (e.g., using the scheme(s) described above) or simply discard the user data and indicate, in a NAS response message to the UE 201, that a regular bearer should be established instead.

As still another alternative, the MME 2012 may base the above described reactive decisions on per-UE statistics. To this end, the MME 2012 may monitor the transactions/communication performed by the UE 201 to conclude on what type of access/transmission is most likely to be suitable for this UE 201. Such statistics, as well as monitored number/fraction of suboptimal selections that a UE performs, could also be used for proactive control, allowing the MME 2012 to proactively inform the UE 201 (and optionally the base station 2011) of which type of access/transmission scheme that is prudent for a certain UE 201. The UE statistics could be stored in a user database, such as the Home Subscriber Server (HSS) or Subscription Profile Repository (SPR), and reused at a later time when the UE 201 re-attaches to the network.

Bearer Establishment

The at least one bearer may comprise a plurality of bearers, the step S3*a* for activating may perform activation of the data-over-NAS transmission scheme on a first subset of bearers, and the step for deactivating S3*b* may perform deactivation of the data-over-NAS transmission scheme on a second subset of bearers different from the first subset.

To this end (e.g., during the establishment of a bearer) it is indicated for each bearer whether or not the bearer is using the data-over-NAS transmission scheme in idle mode. There can be several ways to signal this indication.

- It is possible to use a special Quality of Service (QoS) Class Identifier (QCI) value for data-over-NAS transmission scheme. Note that this option may be used even in case a PGW 2014 has no explicit information about the data-over-NAS transmission scheme.
- For instance, a Service Class Identifier may also be utilized to differentiate data-over-NAS transmission scheme and regular bearer traffic.
- It is possible to define a special flag for data-over-NAS transmission scheme as a property of a bearer. This may be quite a flexible solution.

The data-over-NAS indication may apply to a single bearer. It is also possible to apply the indication for all bearers of a PDN connection. It is further possible to signal additional characteristics with regard to the data-over-NAS transmission scheme. It is possible to indicate whether a certain bearer can be established or not. This can also be accomplished via a special QCI value or using the Service Class Identifier or by an additional flag.

The proper characteristics of a bearer may be set up based on subscription information, UE 201 and network configuration data, so that the terminals that are expected to have "small data" will be the terminals to be assigned a bearer for the data-over-NAS transmission scheme.

Also, subscription information, configuration or application interaction may be used to set up filtering rules for the bearers, as described above. This may be used to filter the appropriate data to the data-over-NAS bearer. When multiple bearers are set up for a given UE 201, the filters may provide a way to classify the packets into the bearers, and in that way determine which traffic is subject to the data-over-NAS transmission scheme.

Figure 7:
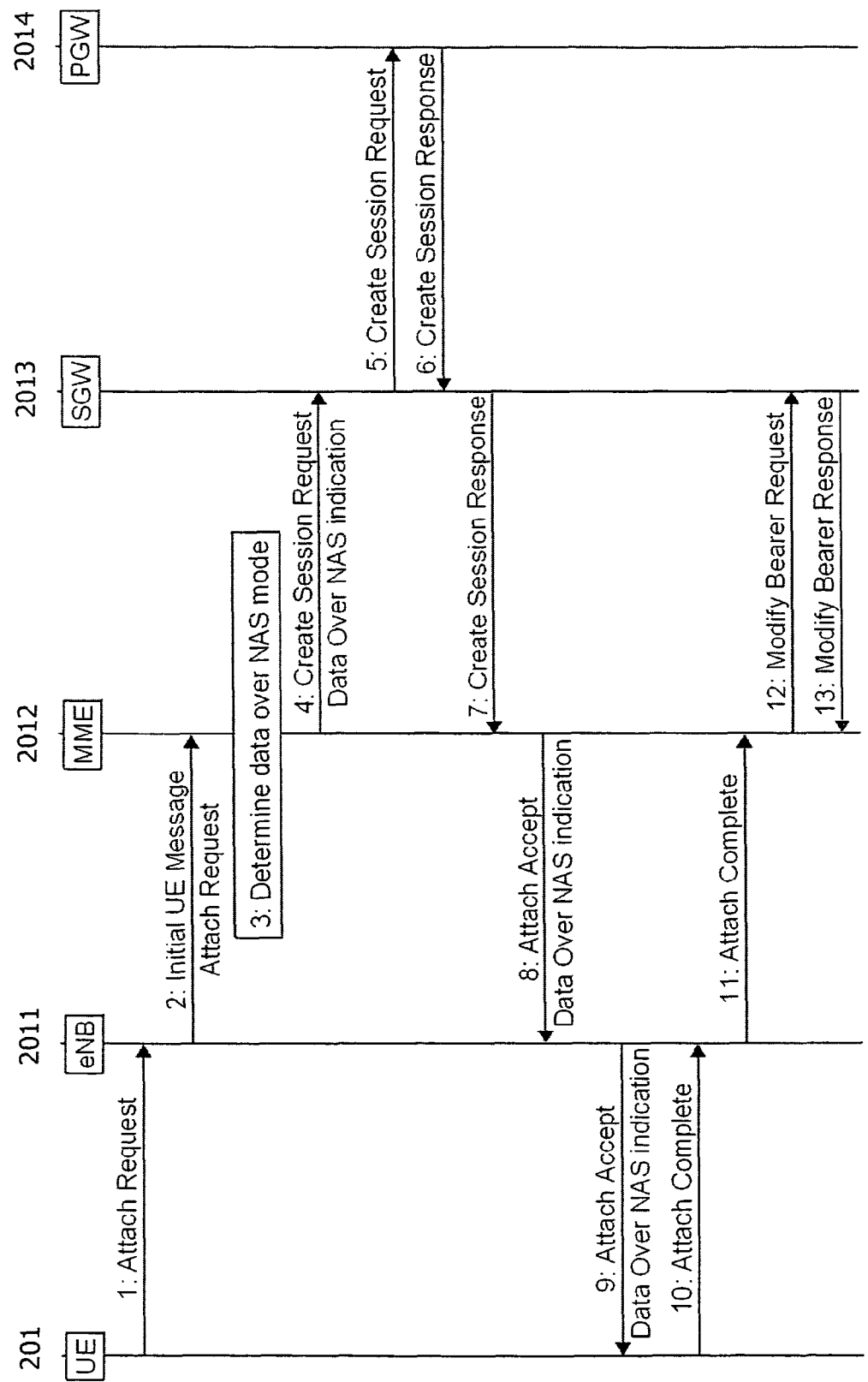
FIG. 7 shows a second exemplary embodiment for bearer establishment during which usage of the data-over-NAS transmission scheme is activated or deactivated.

FIG. 7 shows a second exemplary embodiment for bearer establishment during which usage of the data-over-NAS transmission scheme is activated or deactivated. It is to be noted that only the signalling relevant for the present invention is shown, whereas other signalling, such as for security or policy, is not included.

In step 3 (which may embody the above-described step S3), the MME 2012 may determine that the data-over-NAS transmission scheme is expected to be beneficial for the given UE 201, based on subscription information or UE 201 capabilities or local configuration or an indication in the Attach Request message or a combination of these.

In step 4, the MME 2012 may include an indication to the SGW 2013 that the bearer is to use the data-over-NAS transmission scheme (so as to activate the data-over-NAS transmission scheme for that bearer). This indication may be, for instance, a new flag, or a special QCI value in the Default EPS Bearer QoS parameter.

In step 5, depending on the type of the indication, the data-over-NAS indication may or may not be present in the message (e.g., Create Session Request). The PGW 2014 does not necessarily have to have information on the data-over-NAS transmission scheme for the bearer. However, an indication may be transferred to the PGW 2014 as well.

In steps 8 to 11, activation of the data-over-NAS transmission scheme is indicated to the UE 201 (e.g., together with Attach Accept). This message may also include information about the amount of data that can be transferred over NAS.

Normally, the Attach procedure causes the UE 201 to transit to the connected mode. Hence, even if activation of the data-over-NAS transmission scheme is decided and signalled to the UE 201, the UE 201 may continue the connected mode until an inactivity timeout occurs, which then releases the UE 201 to idle mode.

It is possible though to optimize the above approach further: the MME 2012 may decide to not cause the UE 201 to transit to the connected mode in the Attach procedure. Instead, the Attach Accept and Attach Complete messages may be carried in NAS transport messages on the S1 interface and on RRC, so that the transition to the connected mode is avoided even after the Attach procedure.

It is also possible for the MME 2012 to first establish the connected mode in the Attach procedure, and then perform S1 connection release even before such a release is requested by the base station 2011, based on the information that the UE 201 uses the data-over-NAS transmission scheme. This is a simple yet effective approach, as the Attach procedure itself would not be affected.

In step 12, the MME 2012 may inform the SGW 2013 about the parameters (i.e., Tunnel Endpoint Identifier, TEID) used for sending data packets from the SGW 2013 to the MME 2012.

In step 13, the SGW 2013 may inform the MME 2012 about the parameters (i.e., TEID) used for sending data packets from the MME 2012 to the SGW 2013.

Finally, it is to be noted that it is possible to skip messages/steps 12 and 13, and to include the relevant information in messages/steps 4 and 7 instead.

Figure 8:
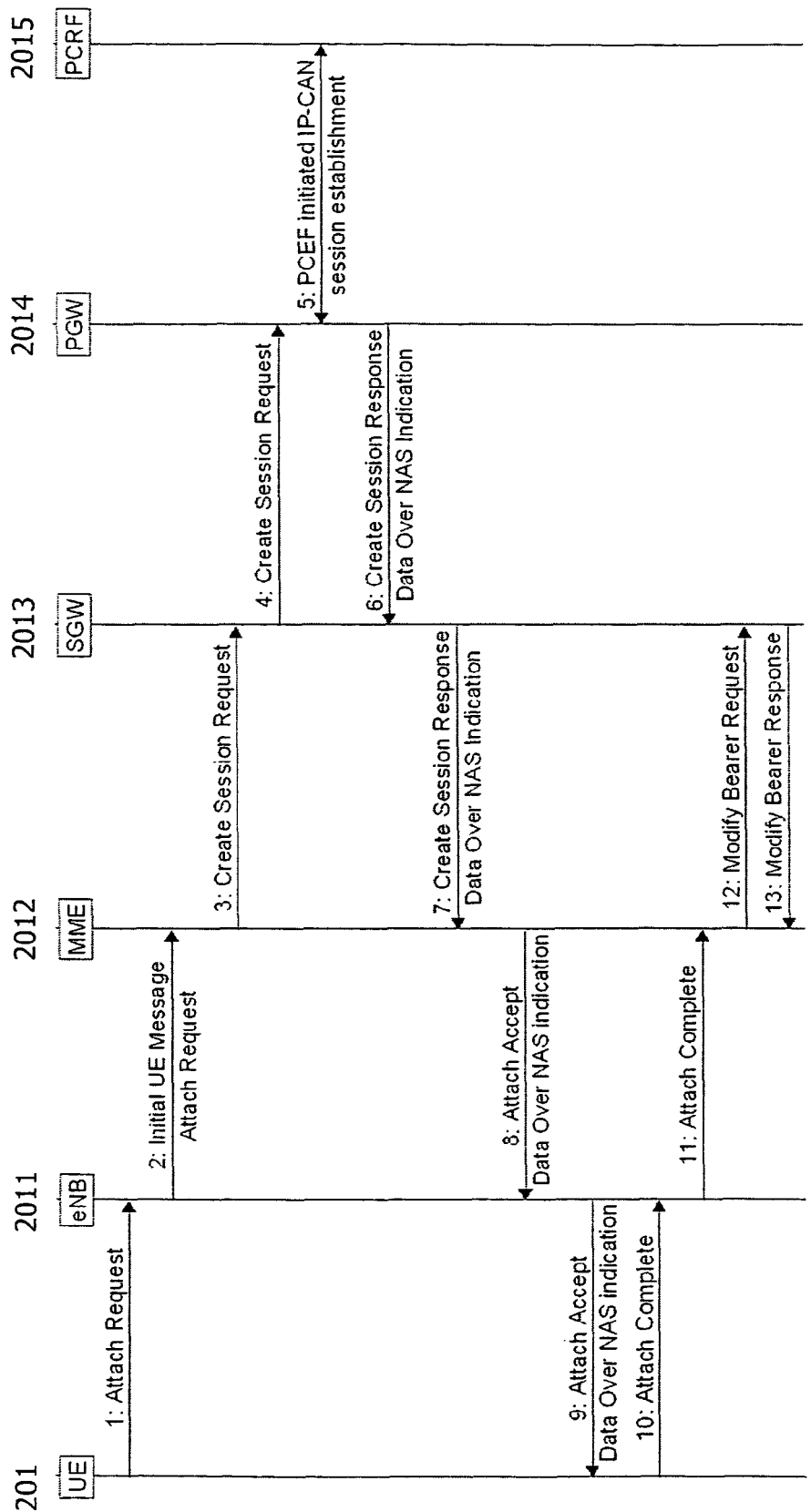
FIG. 8 shows the second exemplary embodiment for bearer establishment in which the decision for using the data-over-NAS transmission scheme is made by a Policy and Charging Rules Function, PCRF.

FIG. 8 shows the second exemplary embodiment for bearer establishment in which the decision for using the data-over-NAS transmission scheme is made by a PCRF 2015 (note that this decision may also embody step S3).

In this case, the PCRF 2015 may use its policy database to determine that the data-over-NAS transmission scheme is to be activated for the given bearer, and indicate this fact to the PGW 2015 in step 5, which then indicates this fact further to the SGW 2013 and MME 2012 in steps 6 and 7. Note that this does not necessarily mean that the PCRF 2015 and PGW 2014 nodes are impacted. It is possible to use a special QCI value as the data-over-NAS indication, and in that case, also legacy PGW 2014 and PCRF 2015 nodes may be involved in the data-over-NAS set up without having explicit information about the data-over-NAS behaviour. Consequently, this setup can be used without impacting the PCRF 2015 or PGW 2014 nodes. It is to be noted also that the PCRF 2015 node is optional, and the necessary functionality to determine whether or not to activate the data-over-NAS transmission scheme may also be integrated into the PGW 2014 as well.

Further, it is to be noted that the above two approaches may be used in combination with one another. That is, both the MME 2012 and the PCRF 2015 may use their information base to decide when activation of the data-over-NAS transmission scheme is deemed to be useful. This determination may first be made in the MME 2012, and the determination can further be updated by the PCRF 2015.

Also in this case, the TEID information in messages/steps 12 and 13 may be sent in messages/steps 3 and 7 instead. However, the MME 2012 may then allocate (and transfer) the TEID before actually being alerted that the TEID information will be needed. In case the MME 2012, after receiving message/step 7, determines that the data-over-NAS transmission scheme should not be used, the MME 2012 may deallocate the TEID.

The approaches above are also applicable in a similar way for the case when a new bearer is set up using the UE 201 requested PDN connectivity procedure. A difference here is that such a procedure may be carried out in connected mode, since the PDN Connectivity Request message might not be used as an initial message. Hence, the UE 201 may need to send a Service Request message first.

Figure 9:
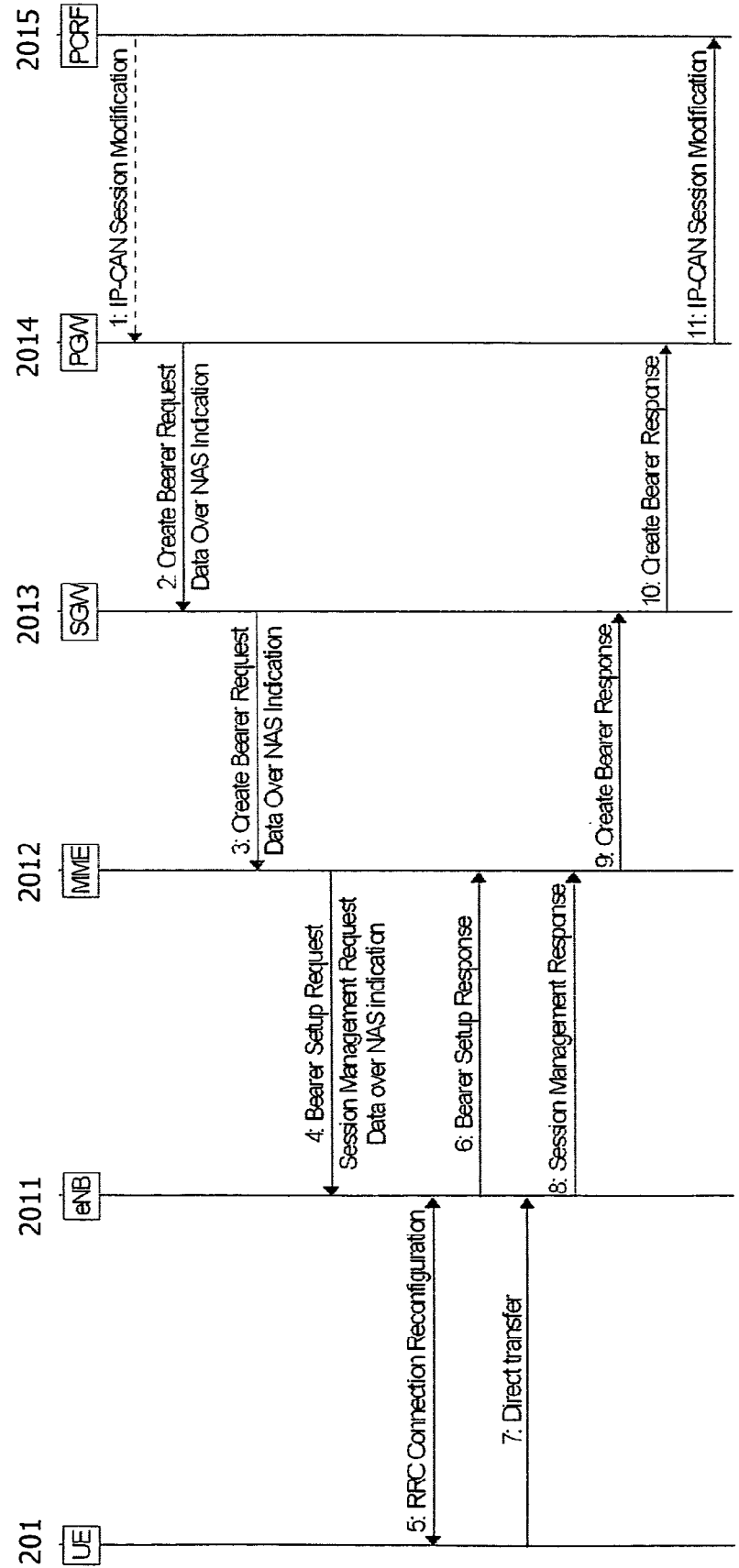
FIG. 9 shows the second exemplary embodiment for bearer establishment for a dedicated bearer on an existing PDN connection.

FIG. 9 shows the second exemplary embodiment for bearer establishment for a dedicated bearer on an existing PDN connection.

In this case, the process may be initiated by the PCRF 2015, or by the PGW 2014 based on a trigger such as local configuration or an indication/request sent from an Application Server to the PCRF 2015. A data-over-NAS indication may be sent to the SGW 2013 and MME 2012 (e.g., in a Create Bearer Request message, steps 2 and 3), and the indication may be sent from the MME 2012 to the UE 201 as part of the NAS messaging (e.g., in messages Bearer Setup Request and RRC Connection Reconfiguration, steps 4 and 5). It is to be noted that similarly as above, the data-over-NAS indication does not necessarily mean any impact for the PCRF 2015 and the PGW 2014: the indication may be based on a special QCI value as well so as to allow support by existing nodes.

The above procedure may require that the UE 201 is in connected mode; when in idle mode, the UE 201 may be paged first. After an inactivity timeout has lapsed in the base station 2011, the UE 201 may be released to the idle mode (using e.g., the S1 release procedure) so that the UE 201 can benefit from activation of the data-over-NAS transmission scheme.

It is possible for the MME 2012 to perform the S1 release even before such a release is requested by the base station 2011, based on information that the UE 201 uses the data-over-NAS transmission scheme. This is especially motivated if there is no other bearer that uses the regular bearer transmission scheme.

Further, UE 201 requested or MME 2012 requested bearer activation is also possible, following a signalling sequence similar to that shown in chapter "Explicit signalling for switching method between data-over-NAS and regular bearer mode". UE 201 requested bearer switching may be triggered by an application level (i.e., sent on the user plane) indication/request from an Application Server associated with the UE 201.

The data-over-NAS transmission scheme could also be activated on demand, when the UE 201 or the network 200 measures the traffic volume and determines that the UE 201 has infrequent small data transmissions. The MME 2012 or the PGW 2014 may analyse the traffic data, and make a prediction about whether activation of the data-over-NAS transmission scheme would be beneficial based on the given traffic pattern. Similarly, for a UE 201 that has a data-over-NAS bearer, a regular bearer could also be established on demand, when the UE 201 or the network measures that the traffic volume is above a threshold, and a regular bearer is more efficient. It is also possible to use the trigger criteria listed in chapter "Explicit signalling for switching method between data-over-NAS and regular bearer mode" to establish a new bearer.

Uplink Transmission in Idle Mode

Still further, with reference to step S4 of FIG. 4, the router 201x8 of the network entity 201x performs routing, after activation of the data-over-NAS transmission scheme on the at least one bearer, of the data packets over the at least one bearer. Specifically, the data packets may be transmitted on the uplink of the bearer.

In that case, when the UE 201 intends to send uplink data in idle mode, the filters in the UE 201 may be configured to determine which bearer the packet is to be mapped to. Alternatively, it may also be possible for the application running on the UE 201 to explicitly influence the bearer mapping. The bearer mapping may determine whether the data-over-NAS transmission scheme is to be applied, depending on whether or not the data-over-NAS transmission scheme is active for the given bearer.

Still further, for instance, there may be a separate PDN connection involving a first bearer and a second bearer, wherein individual IP addresses are respectively assigned to the first and second bearers. In other words, as a special case, if a separate PDN connection is used for the data-over-NAS transmission scheme and for regular bearer transmissions, then separate IP addresses may apply to the two bearers. In that case, the IP address itself may determine whether the data-over-NAS transmission scheme is to be activated or not. This applies to both uplink and downlink. From the application point of view, this may be perceived as if the data-over-NAS transmission scheme would be effected on a separate interface.

Optionally, the UE 201 might in certain cases have application information about the expected traffic pattern, and may decide in case of a large amount of expected traffic that it is more efficient to switch to the connected mode. It is to be noted, however, that such application "awareness" may not available since it is generally difficult to impact the applications.

Still further, for instance, the determining step may comprise thresholding uplink traffic against a traffic volume threshold, and if the traffic volume is below the threshold, the data-over-NAS transmission scheme is used, and if the traffic volume is equal to or greater than the threshold, the at least one bearer is established in a connected mode. In other words, as yet another alternative, it is possible to decide on which bearer to use based on the traffic volume. Up to a threshold, a bearer with data-over-NAS transmission scheme can be used, and above that threshold, a regular bearer can be established. The threshold can be configured into the UE 201, by NAS signalling, or system broadcast information, OTA signalling, or by other means.

The UE 201 takes action depending on whether the packet is to be sent on via the data-over-NAS transmission scheme or not:

If the packet is to be sent using the data-over-NAS transmission scheme, the UE 201 may send the packet encapsulated in a NAS packet, and the packet may then be delivered as a NAS packet towards the MME 2012. The MME 2012 may forward the packet to the SGW 2013 which in turn forwards the packet to the PGW 2014.

If the packet is to be sent using the connected bearer mechanism, the UE 201 may, in idle mode, first issue a Service Request, which results in the UE 201 becoming connected, wherein the setup of RRC connection to the base station 2011 may include security and the setup of the bearers. Once in connected mode, the packets can be sent on the appropriate bearers.

Downlink Transmission in Idle Mode

The data packets may be transmitted on the downlink of the bearer.

Downlink packets may be classified into one of the bearers in the PGW 2014. That applies to a GTP based S5 interface variant. For a Proxy Mobile IP (PMIP) based S5 interface variant, the classification may be performed in the SGW 2013 based on filters downloaded to the SGW 2013. This allows the SGW 2013 to determine, based on the settings for the given bearer, whether the data-over-NAS transmission scheme is to be used for the delivery of the downlink packet in idle mode or not.

If the data-over-NAS transmission scheme is to be used, the packet is sent from the SGW 2013 to the MME 2012. This transmission may be performed using the Downlink Data Notification message, or using another type of message. Once the SGW 2013 receives an ACK (such as the ACK for the Downlink Data Notification) from the MME 2012 for receiving the data, the SGW 2013 no longer needs to buffer the packet, as the MME 2012 has taken responsibility for delivering the packet from that time onwards.

For instance, the method as generally illustrated in FIG. 4 may further comprise transmitting the data packet from the MME 2012 to the UE 201 by paging the UE 201 if the UE 201 is not in a connected mode, receiving, at the MME 2012, a Service Request message responsive to the paging; and establishing a connection via the EPS S1 interface. In other words, the MME 2012 may try to deliver the message to the UE 201. If the UE 201 is not in connected mode, the MME 2012 may first page the UE 201. As a result of the paging, the UE 201 may send a Service Request message to the MME 2012. The MME 2012 may thus derive that it is necessary to deliver a packet over data-over-NAS, hence the MME 2012 does not set up the UE 201 context in the base station 2011 for connected mode (including, for instance, security and bearer setup in the base station 2011), but only a "plain" S1 connection is established (wherein "plain" here means a connection with an eNB UE S1AP ID in the base station 2011 and an MME UE S1AP ID in the MME 2012). Instead, the MME 2012 may deliver the packet over data-over-NAS to the UE 201.

In cases when the UE 201 uses both a bearer with the data-over-NAS transmission scheme and a regular bearer simultaneously, the purpose of a Service Request received in the MME after paging the UE 201 might be considered ambiguous. The Service Request is probably a response to the paging, but on the other hand, there is also a small probability that the Service Request was triggered by UL data on a regular bearer or pending UL signalling (as the UE 201 may not have received the paging yet). However, the MME 2012 may differentiate these two cases by taking into account the RRC establishment cause value that is delivered together with the Service Request in the S1 Initial UE Message. If the establishment cause indicates mobile originating data or signalling, the UE 201 should be caused to transit to connected mode. However, if the RRC establishment cause indicates mobile terminating access, then the Service Request can be assumed to be a response to paging, and hence the MME 2012 can determine, as described above, that the UE 201 should not be caused to transit to the connected mode and hence downlink data can be delivered over NAS without establishing security and bearers in the base station 2011.

Connected Mode Handling

In cases when a UE 201 is assigned both a data-over-NAS "bearer" and a regular bearer (in the connected mode), the use of the regular bearer for data traffic results in the UE 201 becoming connected. Also, signalling procedures can cause the UE 201 to become connected (even in a case when the UE 201 only has a data-over-NAS "bearer"). The UE 201 may also request to become connected when it expects more traffic.

Preferably, all bearers are established on an air interface between the UE 201 and the base station 2011 in connected mode. This implies that even the bearers that use the data-over-NAS transmission scheme may become regularly established bearers. In other words, the data-over-NAS transmission scheme of packet delivery may be disabled while the UE 201 is in connected mode.

As an alternative, in connected mode, the data-over-NAS transmission scheme might not be assigned a radio bearer between the UE 201 and the base station 2011. This means that even when the UE 201 is in connected mode, the data-over-NAS transmission scheme is used for delivering even those packets that are mapped/assigned to bearers set for the data-over-NAS transmission scheme. If so, the data-over-NAS transmission scheme setting may apply to a bearer substantially all the time independent of whether the bearer in question is connected. This approach may require one or more of the following preparatory measures:

Not establishing radio bearers with data-over-NAS transmission may require deviation from a principle that all bearers are established. If UE 201 is only assigned data-over-NAS bearers, and becomes connected due to a signalling procedure, it is necessary to set up the bearer state in the base station 2011 according to current procedures, for instance, it may be disallowed to be in connected state without the bearers being established. Once the bearers are established in the base station 2011, the bearers may be used for data transmission as well.

It is also possible to keep UE 201 with only a data-over-NAS "bearer" idle for substantially all the time; if, for example, signalling procedures may attempt a transition of the UE 201 to the connected state, such a transition may be blocked, circumvented etc.

If the data-over-NAS transmission scheme is used even while the regular bearers are established, appropriate filtering rules may be used to differentiate data-over-NAS packets from regular bearer packets.

Still further, the UE 201 may have one established radio bearer in a connected mode and one radio "bearer" for employing the data-over-NAS transmission scheme. If so, the method may further comprise utilizing the radio bearer in the connected mode for the data packets assigned to the data-over-NAS transmission scheme. In other words, when the UE 201 becomes connected, even packets that would be carried via the data-over-NAS transmission scheme (in idle mode) may use the regular radio bearers. If so, when the UE 201 is in the connected mode, an uplink packet may be delivered via the radio bearer even when the bearer actually corresponds to a data-over-NAS "bearer". Also for a downlink packet, the SGW should deliver the packet on the corresponding GTP bearer to the base station 2011 when the UE 201 is in the connected mode.

Communication Between the MME and the SGW

Multiple options are feasible for managing the packet transfer between the MME 2012 and the SGW 2013, which may be a consequence of activation of the data-over-NAS transmission scheme. In one class of solutions, the signalling between MME 2012 and SGW 2013 may be extended. That is, for instance, the routing may at least partially be performed between the SGW 2013 to the MME 2012.

For instance, the method as generally illustrated in FIG. 4 may further comprise establishing a GTP-U tunnel between the MME 2012 and the SGW 2013 based on signalling on the S11 interface, wherein GTP-U stands for the user plane of the General Packet Radio Service (GPRS) Tunnelling Protocol (GTP) and S11 interface stands for the interface between the MME 2012 and the SGW 2013 in Evolved Packet System (EPS). In other words, one possibility resides in setting up a GTP-U tunnel based on a new signalling on the S11 interface. That is, the GTP-C control signalling between the MME and the SGW may setup the GTP-U TEIDs, as described herein above.

The method may further comprise extending the GTP-C protocol on the S11 interface by a functionality of carrying the data packets, wherein GTP-C stands for the control plane of the GTP. In other words, it is also possible to extend the GTP-C protocol on S11 to be able to carry data packets. This is advantageous especially if the traffic volume is limited.

It is possible to use another protocol to carry the IP packets, such as encapsulation via Generic Routing Encapsulation (GRE).

Moreover, as generally illustrated in FIG. 4 the method may further comprise accommodating the data packets in or on a Downlink Data Notification message. In other words, the (initial) downlink packets from the SGW 2013 to the MME 2012 can be delivered by "piggybacking" the packets to the Downlink Data Notification message.

The method may also comprise utilizing S1-U tunnelling between the MME 2012 and the SGW 2012, wherein S1-U stands for the user-plane part of the S1 interface. In other words, S1-U tunnelling between MME 2012 and SGW 2013 may be used, so that the MME 2012 may appear as a logical base station towards the SGW 2013. This has the advantage this solution is even compliant with a legacy SGW 2013 that is not (yet) configured for the data-over-NAS transmission scheme as described in the following.

In case the UE 201 is only assigned a data-over-NAS "bearer" (or multiple such bearers) without a simultaneous regular bearer (that can be handled to use the data-over-NAS transmission scheme), the MME 2012 may signal the MME address and TEID towards the SGW 2013 using, for example, the Modify Bearer Request/Response message pair as if the MME 2012 was the base station 2011 (i.e., S1-U tunnelling may be used between the MME 2012 and the SGW 2013). If the UE 201 is caused to transit to the connected mode occasionally, such a transition may be handled, from the SGW 2013 point of view, as if a handover was performed to the "real" base station 2011, and a Modify Bearer Request/Response message pair may be used to signal the base station address and TEID to the SGW 2013. When the UE 201 is caused to transit back to the idle mode, such a transition may be handled as a handover in order to change the S1-U address and TEID to the S1-U address and TEID of the MME 2012. The alternative just described is further detailed with respect to FIGS. 10A and 10B.

Figure 10A:
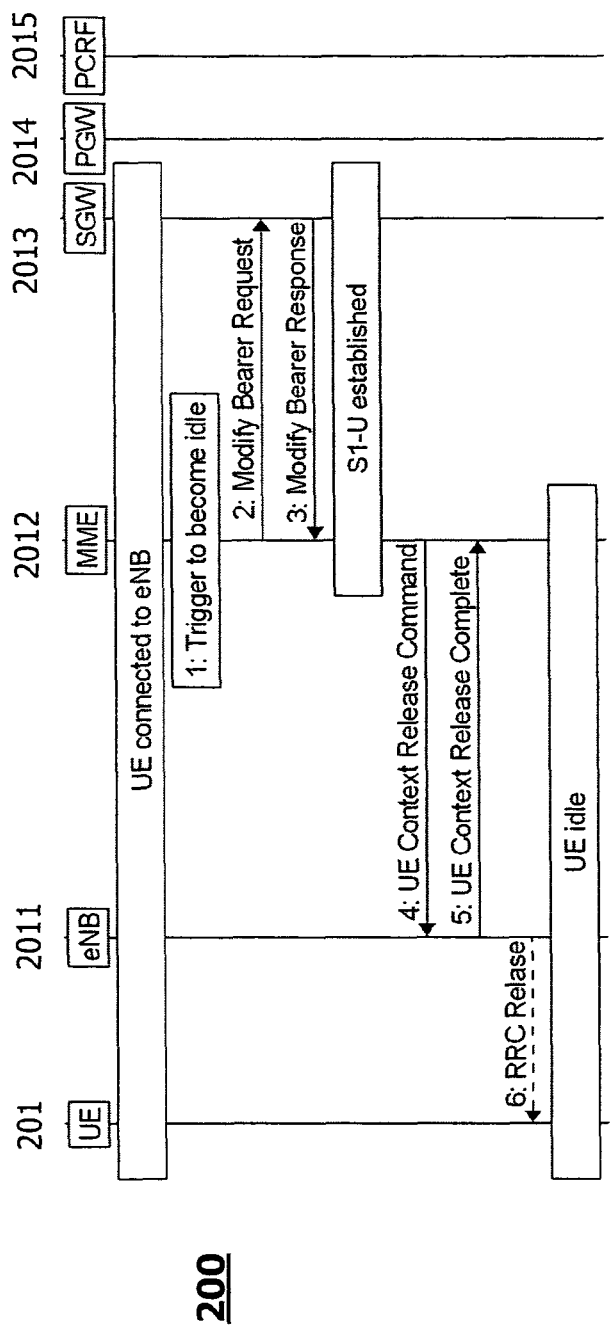
FIG. 10A shows a third exemplary embodiment for communication between the MME and the SGW in case of the terminal/UE being initially being in the connected mode.

FIG. 10A shows a third exemplary embodiment for communication between the MME 2012 and the SGW 2013 in case of the UE 201 initially being in the connected mode.

In step 1, a trigger may start the process to transit to idle mode having the data-over-NAS transmission scheme activated. Such a trigger may be, for instance, explicit signalling from the base station 2011 about user inactivity, or an explicit request from the UE 201 to change the delivery scheme to the data-over-NAS transmission scheme, or may be the result of an analysis in the MME 2012 and/or SGW 2013 and/or PGW 2014 that the data-over-NAS transmission scheme is more beneficial for the UE 201 with the given traffic pattern, which can trigger the process at the next connected-to-idle transition.

In steps 2 and 3, the MME 2012 may signal the MME's IP address and TEIDs towards the SGW 2013 (e.g., as downlink GTP-U endpoints). As a result, S1-U is established between MME 2012 and SGW 2013.

Finally, in steps 4 to 6, the UE 201 may be released to idle mode. Afterwards, transmission via the data-over-NAS transmission scheme may be performed, (e.g., with the SGW 2013 and MME 2012 using the S1-U bearer established between the SGW 2013 and the MME 2012).

FIG. 10B shows the third exemplary embodiment for communication between the MME 2012 and the SGW 2013 in case of the UE 201 being initially being in the idle mode.

In step 1, a trigger condition in the MME 2012 may start the process to transit to the connected mode. Such a trigger may be, for instance, an explicit request from the UE 201 to change the delivery scheme to regular bearers (this may be a Service request or another message), or may be the result of an analysis in the MME 2012 and/or SGW 2013 and/or PGW 2014 that the data-over-NAS transmission scheme is more beneficial for the UE 201 with the given traffic pattern.

In steps 2 to 4, if the S1 and RRC connections are not established (e.g., due to explicit UE 201 signalling in this respect), then the UE 201 may be paged (e.g., by the MME 2012 via the base station 2011), and the UE 201 may return a Service request which is to establish the RRC and S1 connections.

In steps 5 to 8, the UE 201 context may be established in the base station 2011, and the security and bearer associations in the air interface may be created, involving the messages shown in steps 5 to 8 (Initial Context Setup Request/Response, Security Setup and/or RRC Connection Reconfiguration).

Finally, in steps 9 and 10, the MME 2012 may modify the S1-U tunnel endpoints so as to refer to the base station 2011. From the SGW 2014 point of view, this procedure may appear as a handover away from the logical base station (in the MME 2012) to the current ("real") base station 2011. Afterwards, regular connected mode data transmissions may be performed.

In the following, the case is described when there is both a data-over-NAS "bearer" and a regular bearer. If such a UE 201 becomes idle (employing at least one of the above variants), the MME 2012 may become the S1-U termination point not only for the data-over-NAS "bearer(s)", but also for the regular bearer(s) whose traffic might not pass the MME 2012. In the following, alternatives are described how to implement the above case e.g. in case of downlink traffic.

The MME 2012 may release the S1-U bearers between the MME 2012 and the SGW 2013. This may cause the SGW 2013 to send, for example, Downlink Data Notification messages for all downlink packets received. The Downlink Data notification may also include the bearer ID(s), so that the MME 2012 may determine whether the bearer ID is for a data-over-NAS "bearer" or not. For a (data) packet on a data-over-NAS bearer, the MME 2012 may establish the S1-U bearers between the MME 2012 and the SGW 2013, receive the packet, and then (substantially immediately) release the bearer (s) again. For a packet on a regular bearer, the UE 201 may be caused to transition to the connected mode as described herein above.

The MME 2012 may keep the S1-U endpoints for all bearers including regular bearers. If the MME 2012 receives a downlink packet on a regular bearer, the MME 2012 may first cause the UE 201 to transit to the connected mode as described herein above, and then the MME 2012 may deliver the packet once more (e.g., on the operator's network). This may require that the "outer" IP address of the packet (meaning the IP address of the packet in the operator network) is routable in the operator network from the MME 2012, which routability may be achieved e.g. via configuration or via tunnelling the packet (e.g., through an auxiliary gateway). The MME 2012 may log such routing events in order to consider such logs in a tariff charging for the packet(s).

The MME 2012 may keep the S1-U endpoints for all bearers including regular bearers, and if the MME 2012 receives a downlink packet on a regular bearer, the MME 2012 may deliver the packet to the UE 201 using data-over-NAS transmission scheme, after which the MME 2012 may cause the UE 201 to transit to the connected mode so that subsequent packets on the regular bearer can be delivered via regular connected mode delivery.

The MME 2012 may keep the S1-U endpoints for all bearers including regular bearers, and if the MME 2012 receives a downlink packet on a regular bearer, the MME 2012 may buffer the packet. Then, the MME 2012 may cause the UE 201 to transit to the connected mode. In a next step, the MME 2012 may send the packet to the S1-U endpoint of the current base station 2011 using GTP-U. The MME 2012 may then signal to the SGW 2013 to update the S1-U endpoint to the current base station 2011—from the SGW 2013 point of view, this may appear as a handover. This variant may involve the base station 2011 accepting also downlink packets from the MME 2012, which may be effected via base station configuration.

Another solution resides in allowing only a subset of bearers to be released at the SGW 2013. SGWs 2013 may support this functionality. If this solution is to be employed, the MME 2012 may release only the regular bearer(s) in the idle mode in the SGW 2013, and keep the data-over-NAS S1-U bearer up and terminated in the MME 2012. In this way, a data-over-NAS packet may be delivered to the MME 2012 by GTP-U, while a downlink packet for a regular bearer may cause a Downlink Data Notification to the MME 2012, to be followed by paging, so that the regular bearers are established.

The case of uplink works as above described for the downlink, since the UE 201 may indicate activation or usage of the data-over-NAS transmission scheme (whether it is sending data-over-NAS) or the UE 201 may request the regular bearers to be established, and the MME 2012 can perform accordingly.

Release of S1 and RRC Connections with Data-Over-NAS Transmission Scheme

When the data-over-NAS transmission scheme is active and used to transfer data packets in uplink or downlink, an RRC and an S1 connection may be established. However, if only one (or more) uplink data-over-NAS message is sent, but no downlink message is sent from the MME 2012, then the S1 connection might not be fully established, but for simplicity of description, both fully and partly established S1 connections are referred to as "S1 connections" in this chapter. For instance, full establishment of a logical S1 connection may involve an S1AP message in each direction. Hence, if there is only one (or more) uplink data-over-NAS message and none in response (and no other downlink S1AP message either), the S1 connection might not be fully established. Accordingly, there may be only a base station UE S1AP ID established in the base station 2011, but no corresponding MME UE S1AP ID in the MME 2012. This situation may be referred to as a "half S1 connection" or a "unidirectional S1 connection".

The method as generally illustrated in FIG. 4 may thus further comprise releasing Radio Resource Control (RRC) and an S1 connection upon completion (deactivation) of the data-over-NAS transmission scheme. That is, once the data-over-NAS delivery is complete, the RRC and S1 connections may be released in order to free up base station resources and to reduce energy consumption by the UE 201.

The MME 2012 may release the S1 (and consequently RRC) connections (substantially) immediately after a data-over-NAS message. However, preferably, an advantage may reside in waiting for a (small) period of time to have an answer message also pass through the same S1 and RRC connection. In this way, a timeout can be applied after the last data-over-NAS message. Other possible options are to have limits on the number of data-over-NAS messages, or the bytes delivered in those messages, to trigger the release of the S1 and RRC connections. One other specific option may reside in releasing the S1 and RRC connections (substantially) immediately once an uplink-downlink or a downlink-uplink message pair has been delivered, to enable efficient handling of request-response message pairs.

Another variant may reside in applying other types of filtering or DPI to analyse the packet contents to determine when the S1 and RRC connections may be released.

Still further, for instance, the MME 2012 may release the S1 connection upon reception of a release indication. In other words, yet another alternative may reside in utilizing an indication from the UE 201 that the connection can be released. Such an indication may be carried over RRC and S1 signalling (e.g., together with a data-over-NAS uplink message), or it can be implemented as a flag in the NAS message (e.g., in the information element, IE, containing the user data). It may also be possible to utilize two types of indications: the UE 201 can indicate that the connection can be released (i.e., there is no more data expected) (substantially) immediately after the uplink message so as to deactivate the data-over-NAS transmission scheme. Or, it is possible to use a second type of indication to signal that the connection can be released (and the data-over-NAS transmission scheme can be deactivated) after a downlink response to the uplink message has been delivered. This scheme may be advantageous by facilitating request-response type of communication.

In the above case, the method may further comprise accommodating the release indication in or on a data-over-NAS message. In other words, the release of the S1 and RRC connections may be handled by explicit signalling. Alternatively, it may be possible to "piggyback" an indication on a data-over-NAS message to release the connection. The piggybacked indication may then be included, for example, in the S1AP message carrying the data-over-NAS message, so that the base station 2011 receives the indication. Optionally, an indication may also be forwarded to the UE 201, either included in the NAS message from the MME 2012 or in the RRC message carrying the data-over-NAS message from the base station 2011 to the UE 201. Piggybacking is especially advantageous if the connections are to be released after a message pair has been delivered, so that there is an uplink data-over-NAS message prior to a downlink data-over-NAS message, which may also carry an indication to release the S1 and RRC connections.

Additionally or alternatively, the base station 2011 may also comprise a timeout (e.g., as a backup mechanism) so that contexts and RRC connections are released in all cases. For example, the base station 2011 may request the MME 2012 to perform the S1 release (e.g., by the UE Context Release Request message). The release of the S1 connection may be followed by release of the RRC connection in the base station 2011.

"Hybrid" Bearers

As another refinement, it may be possible to activate and use the data-over-NAS transmission scheme to accommodate/"piggyback" packets on the NAS signalling which may take place during an idle-to-connected mode transition, and then use the regular bearers upon having been established. In this way, it may be possible to piggyback an (initial) uplink packet on the NAS Service Request message. Once the idle-to-connected mode transition is completed, subsequent data (UL and/or DL) may be sent using the regular bearer. The advantage of this refinement may reside in decreasing the delay for the initial uplink packet.

The method as generally illustrated in FIG. 4 may further comprise routing the data packets over the at least one bearer. The routing may comprise accommodating at least one of the data packets in NAS signalling-related messages during a transition of the at least one bearer from the idle mode to a connected mode, and routing the subsequent data packets over the at least one bearer in the connected mode upon completion of the establishment.

Although the primary goal of a hybrid bearer may be considered to convey an initial uplink packet using data-over-NAS piggybacked on the NAS Service Request message, one or more uplink data-over-NAS packets may optionally be piggybacked on subsequent NAS messages, depending on which (if any) of the optional NAS messages of the idle-to-connected mode transition (e.g., the Service Request procedure) are used. Hence, the NAS messages to carry a piggybacked data packet preferably include one or more of the following: the NAS Service Request message (carried, e.g., in the RRC RRCConnectionSetupComplete message), the optional NAS Authentication Response message (carried, e.g., in an RRC ULInformationTransfer message), the optional NAS Security Mode Complete message (carried, e.g., in an RRC ULInformationTransfer message) and/or another optional NAS message (that may be carried in the RRC SecurityModeComplete, the RRC RRCConnectionReconfigurationComplete and/or an RRC ULInformationTransfer message). Once the idle-to-connected mode transition is completed, subsequent uplink data may be sent using the regular bearer.

If any of the above optional NAS messages of the idle-to-connected mode transition (i.e., the Service Request procedure) are used, a "hybrid" bearer may also be used for data-over-NAS transmissions on the downlink. When a hybrid bearer is used for an initial downlink packet, the SGW 2013 may deliver the first packet(s) to the MME 2012 as in the data-over-NAS transmission scheme described herein above. The MME 2012 may page the UE 201, which may respond with a Service Request message, which may be the first NAS message in the idle-to-connected mode transition. The MME 2012 may then utilize one or more of the optional DL NAS messages (if any) during the idle-to-connected mode transition to convey DL data to the UE 201 using the data-over-NAS transmission scheme. These messages include one or more of the following: the optional NAS Authentication Request message (carried e.g. in an RRC DLInformationTransfer message), the NAS optional Security Mode Command message (carried e.g. in an RRC DLInformationTransfer message) and/or optionally one or more transmissions of another optional NAS message (which would be sent in addition to the regular NAS messages of the idle-to-connected mode transition and which would be carried in an RRC DLInformationTransfer message, the RRC SecurityModeCommand message and/or the RRC RRCConnectionReconfiguration message). Once the idle-to-connected mode transition is completed, subsequent downlink data may be sent using the regular bearer.

Afterwards, the MME 2012 may then explicitly instruct the SGW 2013 (e.g., in the Modify Bearer Request message over the S11 interface) to start sending DL data over the regular bearer instead of the data-over-NAS transmission scheme. Alternatively, the SGW 2013 may already have information that the SGW 2013 should start using the regular bearer upon having been established.

The method as generally illustrated in FIG. 4 may also comprise determining whether substantially all data packets in a given communication are to be transmitted using the data-over-NAS transmission scheme, and aborting, if the determining is affirmative, the bearer establishment. In other words, a possible alternative in connection with the hybrid bearers may reside in using conditional abortion of the idle-to-connected mode transition, if all the data to be transmitted during a communication session/event is conveyed by data-over-NAS transmissions during the idle-to-connected mode transition procedure. The trigger for this transition may be e.g. an indication from the application layer or the closure of a socket. The UE 201 may, for instance, set a flag in the NAS Service Request message (or any other NAS message used for data-over-NAS transmission), optionally in the IE carrying the user data, which may indicate lack of data for transfer during the current communication session/event. The MME 2012 may then take appropriate action to abort the idle-to-connected mode transition, since the radio bearer which is about to be established might not be used.

If the MME 2012 determines that there lack of data to transfer (or if the MME 2012 receives information on this), the MME 2012 may take immediate action to abort the idle-to-connected mode transition, possibly after informing the UE 201 of the end-of-data condition. A possible alternative may reside in the UE detecting that there is a lack of UL data and the MME 2012 detecting that there is lack of DL data; if so, the MME 2012 might not abort the procedure until both UL and DL data are exhausted. To implement this scheme, the flag sent by the UE 201 to the MME 2012 may be differentiated between "no more UL data" and "no more data" (wherein the latter may mean both UL and DL data).

As a further alternative, by using filters on the bearers to differentiate data-over-NAS traffic and regular bearer traffic, it is possible to avoid application awareness and yet to enable a precise separation which avoids unnecessary traffic to employ the data-over-NAS transmission scheme. In this way, the signalling load and energy consumption in the UE 201 can be reduced.

Usage Scenarios

Based on the embodiments, refinements, solutions and alternatives described herein above, there are a number of different solutions available for controlling which (type of) traffic is to employ the data-over-NAS transmission scheme, and their use have different advantages as summarized below.

UE 201/MME 2012 Based Switch:

In this case, a single bearer may be used, and the method to be used for data delivery may be determined based on rules (implemented as filters). The UE 201 and/or the MME 2012 may have a traffic threshold, above which the switch from the idle mode (with data-over-NAS transmission scheme) to the connected mode is performed using, for example, the Service Request procedure. The traffic threshold may be based on the number of packets, or the number of bytes, sent in a given period of time, which may apply to both uplink and downlink. This ensures that for larger files/data to be transmitted, the system switches to the regular bearer mechanism having a greater throughput. The UE 201 may, in certain cases, have a priori information when increased traffic is to follow. The UE 201 may also use more complex criteria, similar to the ones listed in chapter "Explicit signalling", to cause transition to the connected mode, the UE 201 may use packet filters, which may be downloaded using NAS or OTA signalling. The network may advise the UE 201 about the criteria to be used, and this advice may be based on network measurements of the traffic pattern, wherein these measurements may be performed in the MME 2012 and/or in the PGW 2014.

When the UE 201 determines a need to switch to the connected mode, the UE 201 may issue a corresponding a Service Request. When the UE 201 sends data traffic via the data-over-NAS transmission scheme, the UE 201 may indicate whether transition to the connected mode—to transfer more or bigger data—is beneficial. This indication may be sent on NAS level, or as RRC and S1 signalling. That is, the NAS packet carrying the user data may itself include this indication. One possibility may reside in reusing the Service Request packet for this purpose. The indication may be based on the buffer status (e.g., whether there is more data to send or not). Based on this indication, the MME 2012 may decide whether to establish the regular bearer(s) and cause transition to the connected mode or not. Alternatively, the MME 2012 may make a decision on its own whether to switch from the idle mode to the connected mode.

In some cases, the data-over-NAS transmission scheme may often be used initially with a subsequent switch to the regular bearer scheme, in which case the signalling load may actually be higher compared to using the regular bearer mode from the start. Therefore, the above approach is advantageous if larger files are rarely used, or when the UE 201 can predict imminent transmission of such large files (possibly based on application awareness).

The UE 201 Uses a Single Bearer:

The single bearer is switched between the idle mode (with data-over-NAS transmission scheme) and regular bearer schemes using explicit signalling, as described in the chapter "Explicit signalling". Using trigger conditions such as filtering traffic, it may be possible to switch the delivery scheme even before a larger file transfer is started. Hence, this approach may reduce the total NAS signalling load. This approach is well suited to occasional large data file transfers in-between small data transmissions.

The UE 201 Uses Multiple Bearers:

In this case, the UE 201 may distribute data-over-NAS traffic and regular bearer traffic in a static fashion. Filtering may be used to map traffic to the bearers. This approach avoids the explicit signalling, and hence it is advantageous by lowering the total signalling load. Also, the approach reduces the delay of delivering data, because no completion of a signalling procedure has to be awaited prior to sending traffic using another scheme. This scheme is well suited in case large files and small data transmissions alternate frequently, and especially when delay (for larger file transfers) is important.

In summary, the present technique brings about multiple advantages. It is possible to use explicit signalling to switch a given bearer between the data-over-NAS transmission scheme of operation and the regular bearer based operation. Such an explicit signalling establishes a common way of operation on a given bearer for both the UE 201 and the network. Switching a single bearer between data-over-NAS and regular bearer mode allows the UE 201 to have only a single bearer, yet use the data-over-NAS transmission scheme for infrequent small data, while it can switch to the regular bearer based data transmission for the cases when larger amounts of packets need to be sent. The use of explicit signalling to control when the data-over-NAS transmission scheme is used for a given bearer makes the solution easier to implement, standardize and operate. By explicit signalling, all concerned nodes will have the same understanding about which mode to use for a given bearer. The solution also makes it easier to use a variety of triggering means to switch between the data-over-NAS transmission scheme (in the idle mode) and the regular bearer mode.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

For reasons of reference, the following abbreviations have been used in the above specification:
3GPP 3rd Generation Partnership Project
API Application Programming Interface
DL Downlink
DPI Deep Packet Inspection
eNB eNodeB
eNodeB E-UTRAN NodeB
EPC Evolved Packet Core
EPS Evolved Packet System
E-UTRAN Evolved UTRAN
GPRS General Packet Radio Service
GRE Generic Routing Encapsulation
GTP GPRS Tunnelling Protocol
GTP-C The control plane of GTP.
GTP-U The user plane of GTP.
HSS Home Subscriber Server
ID Identity/Identifier
IE Information Element
IP Internet Protocol
IP-CAN IP Connectivity Access Network
LTE Long Term Evolution
MME Mobility Management Entity
NAS Non-Access Stratum
OTA Over-The-Air
PCEF Policy and Charging Enforcement Function
PCRF Policy and Charging Rules Function
PDN Packet Data Network
PGW PDN Gateway
PMIP Proxy Mobile IP
QCI QoS Class Identifier
QoS Quality of Service
RRC Radio Resource Control
S1 The interface between the Radio Access Network and the Core Network in EPS (i.e. between an eNB and an MME for the control plane between an eNB and a SGW for the user plane).
S1AP S1 Application Protocol (The control plane protocol between an eNB and an MME.)
S11 The interface between an MME and a SGW in EPS.
S1-U The user plane part of the S1 interface, i.e., the interface between an eNB and a SGW in EPS.
S5 The interface between a SGW and a PGW in EPS.
SGW Serving Gateway
SPR Subscription Profile Repository
TAU Tracking Area Update
TCP Transmission Control Protocol
TEID Tunnel Endpoint Identifier
TR Technical Report
UDP User Datagram Protocol
UE User Equipment
UL Uplink
USIM Universal Subscriber Identity Module
UTRAN Universal Terrestrial Radio Access Network
WG Working Group

The invention claimed is:

1. A method performed by one or more nodes in a communication network, the method comprising:
deciding, in conjunction with a terminal transitioning from an Idle mode to a Connected mode with respect to the communication network, whether to activate or deactivate a Data over Non-Access Stratum (DoNAS) transmission scheme for a bearer, wherein the bearer comprises a logical connection between a Packet Gateway (PGW) of the communication network and a terminal served by the communication network;
configuring network settings for the bearer in dependence on said decision; and
sending an indication of said decision to the terminal, to cause the terminal to configure terminal settings for the bearer in dependence on said decision.

2. The method of claim 1, wherein sending the indication of said decision to the terminal comprises sending the indication via signaling transmitted over a Signaling Radio Bearer (SRB).

3. The method of claim 1, wherein for a case where said decision comprises a decision to activate the DoNAS transmission scheme for the bearer, the method further includes subsequently deciding to deactivate the DoNAS transmission scheme responsive to detecting that, with respect to Idle-mode traffic exchanges between the PGW and the terminal on the bearer for the traffic flow, an amount of traffic or a frequency of traffic exchanges exceeds a defined threshold, and signaling the subsequent decision to the terminal.

4. The method of claim 1, wherein sending the indication of said decision to the terminal comprises sending the indication during an attachment procedure associated with the transition from the Idle mode to the Connected mode, and, when said decision is a decision to activate the DoNAS transmission scheme, sending the indication to the terminal before the terminal transitions to the Connected mode, to thereby prevent said transition by the terminal.

5. The method of claim 1, wherein, when said decision is a decision to activate the DoNAS transmission scheme, the method includes releasing one or more internal connections within the communication network that are used to support Connected mode operation of the terminal, in dependence on said decision.

6. An apparatus implemented in one or more nodes in a communication network, the apparatus comprising:
communication interface circuitry configured for sending and receiving signaling associated with configuring bearers in the communication network; and
processing circuitry operatively associated with the communication interface circuitry and configured to:
decide, in conjunction with a terminal transitioning from an Idle mode to a Connected mode with respect to the communication network, whether to activate or deactivate a Data over Non-Access Stratum (DoNAS) transmission scheme for a bearer, wherein the bearer comprises a logical connection between a Packet Gateway (PGW) of the communication network and a terminal served by the communication network;
configure network settings for the bearer in dependence on said decision; and
send an indication of said decision to the terminal, to cause the terminal to configure terminal settings for the bearer in dependence on said decision.

7. The apparatus of claim 6, wherein the processing circuitry is configured to send the indication of said decision to the terminal by sending the indication via signaling transmitted over a Signaling Radio Bearer (SRB).

8. The apparatus of claim 6, wherein, for a case where said decision comprises a decision to activate the DoNAS transmission scheme for the bearer, the processing circuitry is configured to decide subsequently to deactivate the DoNAS transmission scheme responsive to detecting that, with respect to Idle-mode traffic exchanges between the PGW and the terminal on the bearer for the traffic flow, an amount of traffic or a frequency of traffic exchanges exceeds a defined threshold, and signal the subsequent decision to the terminal.

9. The apparatus of claim 6, wherein the processing circuitry is configured to send the indication of said decision to the terminal during an attachment procedure associated with the transition from the Idle mode to the Connected mode, and, when said decision is a decision to activate the DoNAS transmission scheme, send the indication to the terminal before the terminal transitions to the Connected mode, to thereby prevent said transition by the terminal.

10. The apparatus of claim 6, wherein, when said decision is a decision to activate the DoNAS transmission scheme, the processing circuitry is configured to release one or more internal connections within the communication network that are used to support Connected mode operation of the terminal, in dependence on said decision.

* * * * *